US012375586B2

(12) United States Patent
Meng et al.

(10) Patent No.: US 12,375,586 B2
(45) Date of Patent: Jul. 29, 2025

(54) PACKET FORWARDING METHOD AND APPARATUS, DEVICE, AND STORAGE MEDIUM

(71) Applicant: HUAWEI TECHNOLOGIES CO., LTD., Guangdong (CN)

(72) Inventors: Wanhong Meng, Shenzhen (CN); Yan Xu, Nanjing (CN); Haiyan Chen, Wuhan (CN); Weiwen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 18/073,811

(22) Filed: Dec. 2, 2022

(65) Prior Publication Data
US 2023/0108054 A1 Apr. 6, 2023

Related U.S. Application Data

(63) Continuation of application No. PCT/CN2021/092378, filed on May 8, 2021.

(30) Foreign Application Priority Data

Jun. 4, 2020 (CN) .......................... 202010501721.6

(51) Int. Cl.
*H04L 69/22* (2022.01)
*H04L 45/74* (2022.01)
*H04L 69/08* (2022.01)

(52) U.S. Cl.
CPC .............. *H04L 69/08* (2013.01); *H04L 45/74* (2013.01); *H04L 69/22* (2013.01)

(58) Field of Classification Search
CPC ....... H04L 69/22; H04L 45/306; H04L 45/64; H04L 45/74; H04L 69/08
See application file for complete search history.

(56) References Cited

U.S. PATENT DOCUMENTS

2015/0350156 A1   12/2015  Ma et al.
2016/0323193 A1*  11/2016  Zhou .................. H04L 69/22
(Continued)

FOREIGN PATENT DOCUMENTS

| CN | 104348716 A | 2/2015 |
|---|---|---|
| CN | 105103516 A | 11/2015 |

(Continued)

OTHER PUBLICATIONS

Xu Yu-Hua et al, Research Development of Abnormal Traffic Detection in Software Defined Networking, Jan. 2020 ,25 pages.
(Continued)

*Primary Examiner* — Mansour Oveissi
*Assistant Examiner* — David M Oveissi

(57) ABSTRACT

This application discloses a packet forwarding method and apparatus, a device, and a storage medium. The method includes: obtaining packet configuration information, where the packet configuration information includes a packet parsing rule; parsing a received target packet based on the packet configuration information to obtain a target packet feature; obtaining a packet forwarding rule corresponding to the target packet based on the target packet feature; and forwarding the target packet according to the packet forwarding rule corresponding to the target packet. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

14 Claims, 8 Drawing Sheets

(56) References Cited

U.S. PATENT DOCUMENTS

| | | | |
|---|---|---|---|
| 2017/0085477 A1* | 3/2017 | Li | H04L 69/18 |
| 2018/0375817 A1 | 12/2018 | Ge et al. | |
| 2019/0044866 A1* | 2/2019 | Chilikin | H04L 69/22 |

FOREIGN PATENT DOCUMENTS

| | | | |
|---|---|---|---|
| CN | 105376159 A | 3/2016 | |
| CN | 107342964 A | 11/2017 | |
| CN | 108234339 A | 6/2018 | |
| CN | 104836753 B | 10/2018 | |
| CN | 109995674 A | 7/2019 | |
| CN | 110233800 A | 9/2019 | |
| CN | 110677427 A | 1/2020 | |
| CN | 110933095 A | 3/2020 | |
| CN | 107786447 B | 6/2020 | |
| EP | 3823222 A1 | 5/2021 | |
| IN | 107786441 A | 3/2018 | |

OTHER PUBLICATIONS

Xiaodong Wang et al, PNPL: Simplifying programming for protocol-oblivious SDN networks, Sep. 2018, 17 pages.

Li Xun et al, Base on SDN VPC technology development and practice, Jun. 2015.

Daniel Firestone et al, Azure Accelerated Networking: SmartNICs in the Public Cloud, Apr. 2018, 15 pages.

L. Linguaglossa et al, "Survey of Performance Acceleration Techniques for Network Function Virtualization," in Proceedings of the IEEE, vol. 107, No. 4, pp. 746-764, Apr. 2019, doi: 10.1109/JPROC.2019.2896848.

Xiangyu Gao et al, Switch Code Generation using Program Synthesis, Aug. 2020, 18 pages.

Hardik Soni et al, Composing Dataplane Programs with P, Aug. 2020, 15 pages.

Jiaqi Gao, Ennan Zhai, Hongqiang Harry Liu, Rui Miao, Yu Zhou, Bingchuan Tian, Chen Sun, Dennis Cai, Ming Zhang, and Minlan Yu. 2020. Lyra: A Cross-Platform Language and Compiler for Data Plane Programming on Heterogeneous ASICs. In Proceedings of the Annual conference of the ACM Special Interest Group on Data Communication on the applications, technologies, architectures, and protocols for computer communication (SIGCOMM '20). Association for Computing Machinery, New York, NY, USA, 435 450. https://doi.org/10.1145/3387514.3405879.

Eyal Cidon et al.,"AppSwitch:Application layer Load Balancing within a Software Switch",2017,total:7pages.

Ando Shogo et al:"L7 packet switch:packet switch applying regular expression to packet payload" 2014 IEEE International Workshop Technical Committee on Communications Quality and Reliability (CQR) IEEE, May 13, 2014 (May 13, 2014) pp. 1-6,XP032888328 total:6pages.

* cited by examiner

PACKET FORWARDING METHOD AND APPARATUS, DEVICE, AND STORAGE MEDIUM

CROSS-REFERENCE TO RELATED APPLICATION

This application is a continuation of International Application No. PCT/CN2021/092378, filed on May 8, 2021, which claims priority to Chinese Patent Application No. 202010501721.6, filed on Jun. 4, 2020. The disclosures of the aforementioned applications are hereby incorporated by reference in their entireties.

TECHNICAL FIELD

This application relates to the field of communications technologies, and in particular, to a packet forwarding method and apparatus, a device, and a storage medium.

BACKGROUND

As a network scale and network service data continue to increase, various service requests impose increasingly higher requirements on network data transmission and management. In a conventional technology, a software-defined networking (SDN) technology implements flexible control of network traffic by separating a control plane and a forwarding plane. This makes a network more intelligent as a pipe, and provides a good platform for application and innovation of a core network.

In the conventional technology, a network device on the forwarding plane cannot dynamically forward different service data in a data forwarding process. This results in low service data transmission efficiency and incapability of splitting the different service data.

SUMMARY

An objective of this application is to provide a packet forwarding method and apparatus, a device, and a storage medium, to resolve problems such as low service data transmission efficiency and incapability of splitting different service data.

According to a first aspect, this application discloses a packet forwarding method, including:

obtaining packet configuration information, where the packet configuration information includes a packet parsing rule; parsing a received target packet based on the packet configuration information to obtain a target packet feature, where the target packet feature is used to represent content of the target packet; obtaining a packet forwarding rule corresponding to the target packet based on the target packet feature; and forwarding the target packet according to the packet forwarding rule corresponding to the target packet.

Based on the foregoing technical content, the packet configuration information including the packet parsing rule is obtained, and the packet feature is determined according to the packet parsing rule. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

In a possible implementation, the target packet includes a plurality of protocol fields, the packet configuration information includes target field information, and the target field information is used to represent locations of the plurality of protocol fields of the target packet in the target packet. The parsing a received target packet based on the packet configuration information to obtain a target packet feature includes: parsing the target packet based on the target field information to obtain field content corresponding to the plurality of protocol fields of the target packet; obtaining a packet class code corresponding to the target packet based on the field content, where the packet class code is used to represent an identifier corresponding to a packet feature; and obtaining the target packet feature corresponding to the target packet based on the packet class code corresponding to the target packet.

Based on the foregoing technical content, the target packet is parsed based on the packet configuration information to obtain the field content corresponding to the protocol fields. The packet class code is obtained based on the field content. The corresponding target packet feature is determined based on the packet class code. Different protocol fields can represent features of different service data. For example, data is traffic dedicated to an application, and a port corresponding to the application is different from a port corresponding to another application. Therefore, different application traffic can be split based on field content of the protocol fields, to improve traffic control precision.

In a possible implementation, the target packet includes the plurality of protocol fields, and the packet configuration information further includes a forwarding rule mapping. The obtaining a packet forwarding rule corresponding to the target packet based on the target packet feature includes: obtaining target match field information corresponding to the target packet feature from a plurality of pieces of preset match field information; and obtaining the packet forwarding rule corresponding to the target packet based on the forwarding rule mapping and the target match field information, where the forwarding rule mapping is used to represent a mapping relationship between the target match field information and the packet forwarding rule corresponding to the target packet.

Based on the foregoing technical content, a specific method for obtaining the packet feature is provided by obtaining the match field information corresponding to the target packet feature. Because structures of different packets are not completely the same, it is difficult to directly represent a packet feature for packets that comply with different packet protocols. Feature extraction can be implemented based on match field information and corresponding key protocol fields for the packets that comply with different protocols. This improves compatibility and flexibility of processing different packets.

In a possible implementation, the target match field information includes a key protocol field that is in the plurality of protocol fields of the target packet and that is used to obtain the target packet feature. The obtaining the packet forwarding rule corresponding to the target packet based on the forwarding rule mapping and the target match field information includes: obtaining field content of the key protocol field of the target match field information; performing mapping calculation on the field content of the key protocol field of the target match field information, to obtain a feature identifier of the key protocol field of the target match field information; and obtaining the packet forwarding rule corresponding to the target packet based on a preset forwarding mapping table and the feature identifier of the key protocol field of the target match field information, where the forwarding mapping table is used to represent a mapping relationship between the feature identifier and the packet forwarding rule.

In a possible implementation, the mapping calculation includes one or more of hash calculation, linear transformation calculation, or longest match calculation.

In a possible implementation, the match field information further includes location information, and the location information is used to represent a location of the key protocol field in the packet. The obtaining field content of the key protocol field of the target match field information includes: obtaining a field area of the key protocol field of the target match field information in the target packet based on the location information in the target match field information, and determining packet content in the field area as the field content of the key protocol field of the target match field information.

In a possible implementation, the location information includes an offset value and a length value. The offset value is used to represent a start location or an end location of the key protocol field. The length value is used to represent a length of the key protocol field.

In a possible implementation, the forwarding the target packet according to the packet forwarding rule corresponding to the target packet includes: editing the target packet according to the packet forwarding rule corresponding to the target packet to generate an edited target packet, and forwarding the edited target packet according to the packet forwarding rule corresponding to the target packet.

Based on the foregoing technical content, the target packet is edited according to the packet forwarding rule to generate a second packet, and the second packet is forwarded. Because a traffic path of the second packet has been optimized compared with that of the target packet, transmission efficiency of the second packet is better. This avoids data transmission congestion caused by load imbalance, and implements data traffic split control. Conventional packet forwarding is processed based on a network device on a forwarding plane. In this case, software and hardware usually need to be upgraded from a bottom layer when a traffic path needs to be optimized or modified, causing huge upgrade costs. In the packet forwarding method provided in this embodiment of this application, a corresponding optimized traffic path, that is, a traffic path corresponding to the second packet may be directly formed based on a service data feature, and packet forwarding is implemented based on the original network device on the forwarding plane. This can implement more flexible packet forwarding of different protocols, and reduce the upgrade costs of the network device.

In a possible implementation, the packet forwarding rule includes a target protocol field and field content corresponding to the target protocol field. The editing the target packet according to the packet forwarding rule corresponding to the target packet to generate an edited target packet includes: obtaining a to-be-processed protocol field of the target packet based on the target protocol field of the packet forwarding rule corresponding to the target packet; and editing field content corresponding to the to-be-processed protocol field of the target packet as the field content corresponding to the target protocol field of the packet forwarding rule corresponding to the target packet, to generate the edited target packet.

In a possible implementation, the editing field content corresponding to the to-be-processed protocol field of the target packet as the field content corresponding to the target protocol field of the packet forwarding rule corresponding to the target packet, to generate the edited target packet includes: obtaining preset field content operation information, where the field content operation information includes an operation action item, an operand length item, an operand offset item, and an operation value item, the operation action item is used to represent an operation action on the to-be-processed protocol field, the operand length item is used to represent a length of the to-be-processed protocol field in the target packet, the operand offset item is used to represent a start location of the to-be-processed protocol field in the target packet, and the operation value item is used to represent the field content corresponding to the to-be-processed protocol field; and editing, based on the operation action item, the operand length item, the operand offset item, and the operation value item, the field content corresponding to the to-be-processed protocol field as the field content corresponding to the target protocol field of the packet forwarding rule corresponding to the target packet, to generate the edited target packet.

Based on the foregoing technical content, the preset field content operation information is obtained, and one operation action is implemented based on feature values of four dimensions: the operation action item, the operand length item, the operand offset item, and the operation value item in field content operation information. This effectively improves efficiency and accuracy of modifying the field content corresponding to the target protocol field compared with a logical expression method such as a regular expression.

In a possible implementation, the operation action item includes one or more of addition, deletion, modification or function computing.

In a possible implementation, the forwarding the edited target packet according to the packet forwarding rule corresponding to the target packet includes: obtaining a forwarding port that corresponds to the packet forwarding rule corresponding to the target packet, and sending the edited target packet to the forwarding port; obtaining a forwarding network address that corresponds to the packet forwarding rule corresponding to the target packet, and sending the edited target packet to the forwarding network address; or obtaining a forwarding physical address that corresponds to the packet forwarding rule corresponding to the target packet, and sending the edited target packet to the forwarding physical address.

In a possible implementation, before the obtaining packet configuration information, the method further includes: receiving online forwarding rule editing instructions entered by a user, and editing online the packet forwarding rule of the packet according to the forwarding rule editing instructions.

In a possible implementation, the editing online the packet forwarding rule of the packet according to the forwarding rule editing instructions includes: parsing online the forwarding rule editing instructions based on preset grammatical information to obtain a configuration table corresponding to the forwarding rule editing instructions, where the configuration table is used to represent a method for editing the packet forwarding rule of the packet; and editing online the packet forwarding rule of the packet based on the configuration table.

Based on the foregoing technical content, the packet forwarding rule is edited online by receiving the forwarding rule editing instructions entered by the user. In this way, a debugging operation such as updating or recompiling on the network device on the forwarding plane is not needed. This improves efficiency of adapting to different service data, reduces execution costs of traffic path optimization of the existing network device on the forwarding plane, and improves application flexibility and scope.

In a possible implementation, the configuration table includes first keyword information and second keyword information, the first keyword information is used to represent a current forwarding rule corresponding to the packet, and the second keyword information is used to represent an expected forwarding rule corresponding to the packet. The editing online the packet forwarding rule of the packet based on the configuration table includes: detecting online a difference item between the second keyword information and the first keyword information in the configuration table, where the difference item is used to represent a difference between the current forwarding rule and the expected forwarding rule; obtaining a forwarding rule editing policy corresponding to the difference item based on the grammatical information; and editing online the packet forwarding rule of the packet according to the forwarding rule editing policy.

Based on the foregoing technical content, the first keyword information and the second keyword information are set, and the corresponding packet forwarding rule is determined based on the difference item between the first keyword information and the second keyword information. This simplifies complexity of entering the editing instructions by the user, and improves operation efficiency of the user. In addition, because this is not limited by specific packet protocol content, different packet processing rules can be flexibly customized, and an application scope is improved.

According to a second aspect, this application provides a packet forwarding apparatus, including:

a configuration obtaining module, configured to obtain packet configuration information, where the packet configuration information includes a packet parsing rule; a parsing module, configured to parse a received target packet based on the packet configuration information to obtain a target packet feature, where the target packet feature is used to represent content of the target packet; a rule obtaining module, configured to obtain a packet forwarding rule corresponding to the target packet based on the target packet feature; and a forwarding module, configured to forward the target packet according to the packet forwarding rule corresponding to the target packet.

In this application, the packet configuration information including the packet parsing rule is obtained, and the packet feature is determined according to the packet parsing rule. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

In a possible implementation, the target packet includes a plurality of protocol fields, the packet configuration information includes target field information, and the target field information is used to represent locations of the plurality of protocol fields of the target packet in the target packet. The parsing module is specifically configured to: parse the target packet based on the target field information to obtain field content corresponding to the plurality of protocol fields of the target packet; obtain a packet class code corresponding to the target packet based on the field content, where the packet class code is used to represent an identifier corresponding to a packet feature; and obtain the target packet feature corresponding to the target packet based on the packet class code corresponding to the target packet.

Based on the foregoing technical content, the target packet is parsed based on the packet configuration information to obtain the field content corresponding to the protocol fields. The packet class code is obtained based on the field content. The corresponding target packet feature is determined based on the packet class code. Different protocol fields can represent features of different service data. For example, data is traffic dedicated to an application, and a port corresponding to the application is different from a port corresponding to another application. Therefore, different application traffic can be split based on field content of the protocol fields, to improve traffic control precision.

In a possible implementation, the target packet includes the plurality of protocol fields, and the packet configuration information further includes a forwarding rule mapping. The rule obtaining module is specifically configured to: obtain target match field information corresponding to the target packet feature from a plurality of pieces of preset match field information; and obtain the packet forwarding rule corresponding to the target packet based on the forwarding rule mapping and the target match field information, where the forwarding rule mapping is used to represent a mapping relationship between the target match field information and the packet forwarding rule corresponding to the target packet.

Based on the foregoing technical content, a specific method for obtaining the packet feature is provided by obtaining the match field information corresponding to the target packet feature. Because structures of different packets are not completely the same, it is difficult to directly represent a packet feature for packets that comply with different packet protocols. Feature extraction can be implemented based on match field information and corresponding key protocol fields for the packets that comply with different protocols. This improves compatibility and flexibility of processing different packets.

In a possible implementation, the target match field information includes a key protocol field that is in the plurality of protocol fields of the target packet and that is used to obtain the target packet feature. When obtaining the packet forwarding rule corresponding to the target packet based on the forwarding rule mapping and the target match field information, the rule obtaining module is specifically configured to: obtain field content of the key protocol field of the target match field information; perform mapping calculation on the field content of the key protocol field of the target match field information, to obtain a feature identifier of the key protocol field of the target match field information; and obtain the packet forwarding rule corresponding to the target packet based on a preset forwarding mapping table and the feature identifier of the key protocol field of the target match field information, where the forwarding mapping table is used to represent a mapping relationship between the feature identifier and the packet forwarding rule.

In a possible implementation, the mapping calculation includes one or more of hash calculation, linear transformation calculation, or longest match calculation.

In a possible implementation, the match field information further includes location information, and the location information is used to represent a location of the key protocol field in the packet. When obtaining field content of the key protocol field of the target match field information, the rule obtaining module is specifically configured to: obtain a field area of the key protocol field of the target match field information in the target packet based on the location information in the target match field information, and determine packet content in the field area as the field content of the key protocol field of the target match field information.

In a possible implementation, the location information includes an offset value and a length value. The offset value is used to represent a start location or an end location of the key protocol field. The length value is used to represent a length of the key protocol field.

In a possible implementation, the forwarding module is specifically configured to: edit the target packet according to the packet forwarding rule corresponding to the target packet to generate an edited target packet, and forward the edited target packet according to the packet forwarding rule corresponding to the target packet.

Based on the foregoing technical content, the target packet is edited according to the packet forwarding rule to generate a second packet, and the second packet is forwarded. Because a traffic path of the second packet has been optimized compared with that of the target packet, transmission efficiency of the second packet is better. This avoids data transmission congestion caused by load imbalance, and implements data traffic split control. Conventional packet forwarding is processed based on a network device on a forwarding plane. In this case, software and hardware usually need to be upgraded from a bottom layer when a traffic path needs to be optimized or modified, causing huge upgrade costs. In the packet forwarding method provided in this embodiment of this application, a corresponding optimized traffic path, that is, a traffic path corresponding to the second packet may be directly formed based on a service data feature, and packet forwarding is implemented based on the original network device on the forwarding plane. This can implement more flexible packet forwarding of different protocols, and reduce the upgrade costs of the network device.

In a possible implementation, the packet forwarding rule includes a target protocol field and field content corresponding to the target protocol field. When editing the target packet according to the packet forwarding rule corresponding to the target packet to generate an edited target packet, the forwarding module is specifically configured to: obtain a to-be-processed protocol field of the target packet based on the target protocol field of the packet forwarding rule corresponding to the target packet; and edit field content corresponding to the to-be-processed protocol field of the target packet as the field content corresponding to the target protocol field of the packet forwarding rule corresponding to the target packet, to generate the edited target packet.

In a possible implementation, when editing field content corresponding to the to-be-processed protocol field of the target packet as the field content corresponding to the target protocol field of the packet forwarding rule corresponding to the target packet, to generate the edited target packet, the forwarding module is specifically configured to: obtain preset field content operation information, where the field content operation information includes an operation action item, an operand length item, an operand offset item, and an operation value item, the operation action item is used to represent an operation action on the to-be-processed protocol field, the operand length item is used to represent a length of the to-be-processed protocol field in the target packet, the operand offset item is used to represent a start location of the to-be-processed protocol field in the target packet, and the operation value item is used to represent the field content corresponding to the to-be-processed protocol field; and edit, based on the operation action item, the operand length item, the operand offset item, and the operation value item, the field content corresponding to the to-be-processed protocol field as the field content corresponding to the target protocol field of the packet forwarding rule corresponding to the target packet, to generate the edited target packet.

Based on the foregoing technical content, the preset field content operation information is obtained, and one operation action is implemented based on feature values of four dimensions: the operation action item, the operand length item, the operand offset item, and the operation value item in field content operation information. This effectively improves efficiency and accuracy of modifying the field content corresponding to the target protocol field compared with a logical expression method such as a regular expression.

In a possible implementation, the operation action item includes one or more of addition, deletion, modification or function computing.

In a possible implementation, when forwarding the edited target packet according to the packet forwarding rule corresponding to the target packet, the forwarding module is specifically configured to: obtain a forwarding port that corresponds to the packet forwarding rule corresponding to the target packet, and send the edited target packet to the forwarding port; obtain a forwarding network address that corresponds to the packet forwarding rule corresponding to the target packet, and send the edited target packet to the forwarding network address; or obtain a forwarding physical address that corresponds to the packet forwarding rule corresponding to the target packet, and send the edited target packet to the forwarding physical address.

In a possible implementation, the apparatus further includes a receiving module, configured to: receive online forwarding rule editing instructions entered by a user, and edit online the packet forwarding rule of the packet according to the forwarding rule editing instructions.

In a possible implementation, when editing online the packet forwarding rule of the packet according to the forwarding rule editing instructions, the receiving module is specifically configured to: parse online the forwarding rule editing instructions based on preset grammatical information to obtain a configuration table corresponding to the forwarding rule editing instructions, where the configuration table is used to represent a method for editing the packet forwarding rule of the packet; and edit online the packet forwarding rule of the packet based on the configuration table.

Based on the foregoing technical content, the packet forwarding rule is edited online by receiving the forwarding rule editing instructions entered by the user. In this way, a debugging operation such as updating or recompiling on the network device on the forwarding plane is not needed. This improves efficiency of adapting to different service data, reduces execution costs of traffic path optimization of the existing network device on the forwarding plane, and improves application flexibility and scope.

In a possible implementation, the configuration table includes first keyword information and second keyword information, the first keyword information is used to represent a current forwarding rule corresponding to the packet, and the second keyword information is used to represent an expected forwarding rule corresponding to the packet. When editing online the packet forwarding rule of the packet based on the configuration table, the receiving module is specifically configured to: detect online a difference item between the second keyword information and the first keyword information in the configuration table, where the difference item is used to represent a difference between the current forwarding rule and the expected forwarding rule; obtain a forwarding rule editing policy corresponding to the difference item based on the grammatical information; and edit online the packet forwarding rule of the packet according to the forwarding rule editing policy.

Based on the foregoing technical content, the first keyword information and the second keyword information are set, and the corresponding packet forwarding rule is determined based on the difference item between the first keyword information and the second keyword information. This simplifies complexity of entering the editing instructions by the user, improves operation efficiency of the user. In addition, because this is not limited by specific packet protocol content, different packet processing rules can be flexibly customized, and an application scope is improved.

According to a third aspect, an embodiment of this application provides a network device. The network device includes a processor, a memory, and a transceiver.

The processor is configured to control the transceiver to receive and send a signal. The memory is configured to store a computer program. The processor is further configured to invoke and run the computer program stored in the memory, so that the network device performs the method provided in any implementation of the first aspect.

According to a fourth aspect, an embodiment of this application provides an electronic device, including a processor. The processor is configured to execute a computer program to perform the method provided in any implementation of the first aspect. The electronic device further includes a communications interface, where the processor is connected to the communications interface.

According to a fifth aspect, an embodiment of this application provides a computer-readable storage medium, including computer code. When the computer code is run on a computer, the computer is enabled to perform the method provided in any implementation of the first aspect.

According to a sixth aspect, an embodiment of this application further provides a computer program product, including program code. When a computer runs the computer program product, the program code performs the method provided in any implementation of the first aspect.

According to a seventh aspect, an embodiment of this application further provides a chip, including a processor. The processor is configured to invoke and run a computer program stored in a memory, to perform the method provided in any implementation of the first aspect.

With reference to the foregoing technical solutions, in this application, the packet configuration information including the packet parsing rule is obtained, and the packet feature is determined according to the packet parsing rule. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

DESCRIPTION OF EMBODIMENTS

Figure 1:
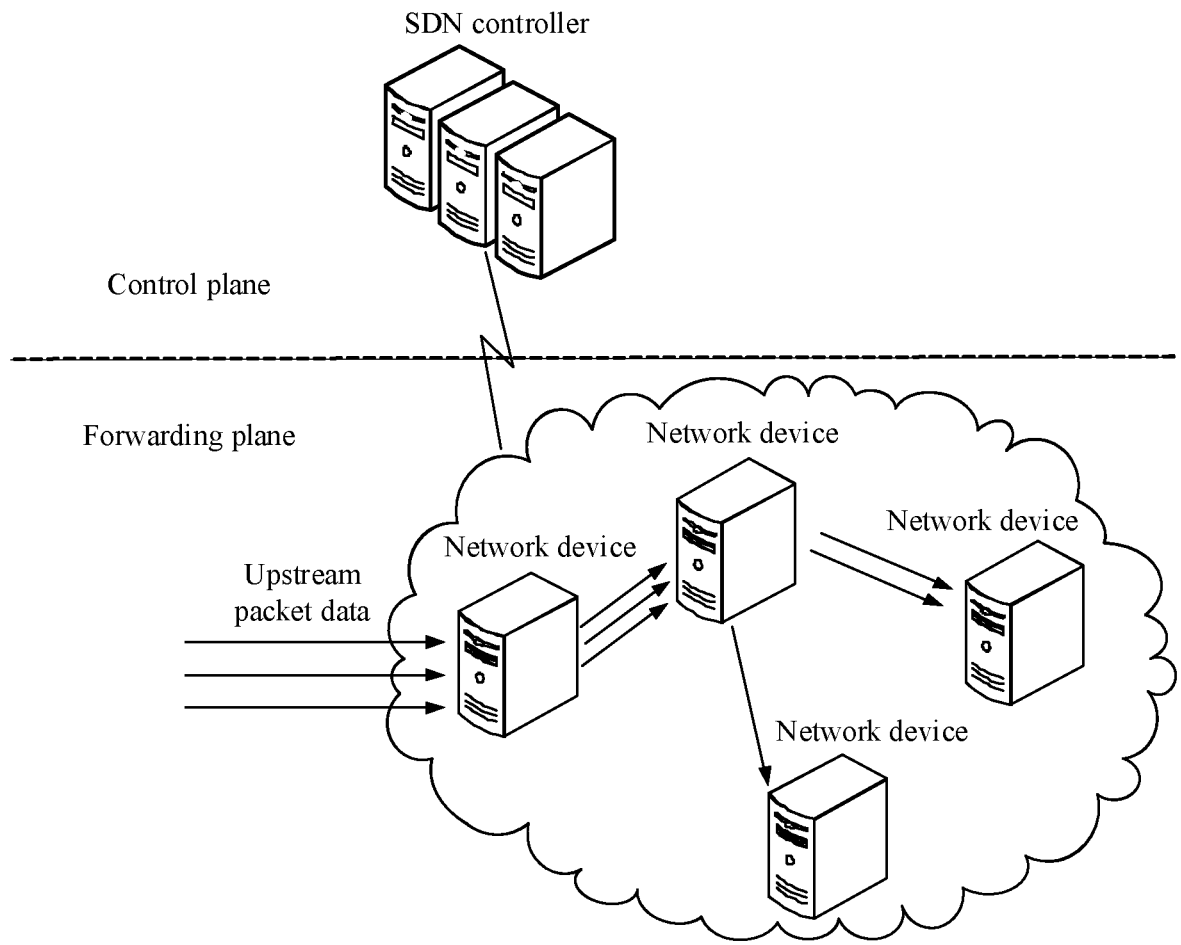
FIG. 1 is a schematic diagram of an application scenario according to an embodiment of this application.

Embodiments of this application may be applied to a network device or any electronic device that may perform the embodiments of this application. In the following, some terms in this application are described, to help a person skilled in the art have a better understanding. It should be noted that when solutions in the embodiments of this application are applied to the network device or to any electronic device that may perform the embodiments of this application, names of units and modules may change, but this does not affect implementation of the solutions in the embodiments of this application.

It should be understood that the network device provided in the technical solutions in the embodiments of this application may be applied to various communications systems. The communications system may be, for example, a wireless local area network (WLAN) communications system, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future fifth-generation mobile communications technology (5G) system, or another system that may appear in the future.

Terms used in the embodiments of this application are only used to explain specific embodiments of this application, but are not intended to limit this application. In the following, some terms in this application are described, to help a person skilled in the art have a better understanding.

(1) Packet (packet): The packet is a data unit exchanged and transmitted on a network. During transmission, the packet is encapsulated into a group, a package, or a frame as required for transmission. The encapsulation mode is to add some protocol fields, that is, packet headers, according to the protocol, to describe a packet type, packet version, packet length, and packet entity of the packet. A network device sends the packet to a corresponding network path by parsing specific content in the protocol fields.

(2) A network device, also referred to as a radio access network (radio access network, RAN) device, is a device for connecting a terminal device to a wireless network, and includes devices in various communications standards. For example, the network device includes but is not limited by a transmission point (TRP), a base station (for example, a gNB), a radio network controller (RNC), a Node B (NB), a base station controller (BSC), a BTS (base transceiver station, BTS), an HeNB ( ) or HNB (home Node B), a baseband unit (BBU), and the like.

(3) The term "a plurality of" indicates two or more, and another quantifier is similar to the term "a plurality of". "And/or" describes an association relationship between associated objects and represents that three relationships may exist. For example, A and/or B may represent the following three cases: Only A exists, both A and B exist, and only B exists. The character "|" usually represents an "or" relationship between the associated objects.

(4) "Correspondence" may refer to an association relationship or a binding relationship, and that A corresponds to B refers to an association relationship or a binding relationship between A and B.

It should be noted that nouns or terms used in the embodiments of this application may be mutually referenced, and details are not described again.

Figure 2:
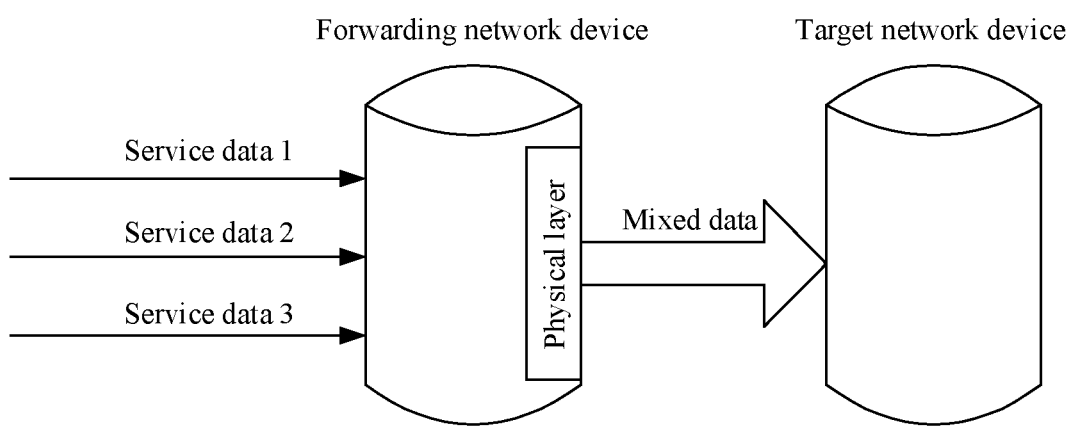
FIG. 2 is a schematic diagram of a process of forwarding packet data by a network server.

FIG. 1 is a schematic diagram of an application scenario according to an embodiment of this application. As shown in FIG. 1, a packet forwarding method provided in this embodiment of this application may be applied to a network device on a forwarding plane in SDN, for example, a network server, a router, or a switch. The network device is located on the forwarding plane. The network device is communicatively connected to an SDN controller on a control plane, and can receive instructions sent by the SDN controller or a service APP. Based on the forwarding instructions sent by the SDN controller, upstream packet data is received and forwarded. FIG. 2 is a schematic diagram of a process of forwarding packet data by a network device. As shown in FIG. 2, in a conventional technology, a forwarding network device on a forwarding plane forwards the packet data according to a conventional hierarchical forwarding model. For example, a link layer performs identification processing on a packet based on a physical address (MAC address), and then sends the packet to a target network device corresponding to the MAC address. A network layer forwards the packet data based on a network address (IP address). However, as types and quantities of Internet services increase, forwarding based on only the MAC address and the IP network address cannot meet a requirement of an application layer on a network. Any type of service data is forwarded according to only a forwarding rule preset by the network device based on an outer IP address. Consequently, different service data cannot be split. For example, in a process of forwarding VXLAN data, the network device on the forwarding plane needs to receive large-traffic data of hundreds of GB from an upstream data center. The network device forwards the large-traffic data only based on an outer IP address, cannot further subdivide the large-traffic data based on application layer information of an upper layer, and can only forward the data as one piece of traffic. In this case, because the large-traffic data cannot be evenly diverted to different traffic paths, a specific traffic path bears a large amount of traffic, and load cannot be balanced. This affects packet data transmission efficiency.

This embodiment of this application provides a packet forwarding method to resolve the foregoing low service data transmission efficiency and incapability of splitting different service data. The different service data is forwarded based on different forwarding policies by parsing the different service data. This implements forwarding control and data splitting of the different service data, improves service data forwarding efficiency and adjustment precision, and avoids low service data transmission efficiency and incapability of splitting the different service data.

Figure 3:
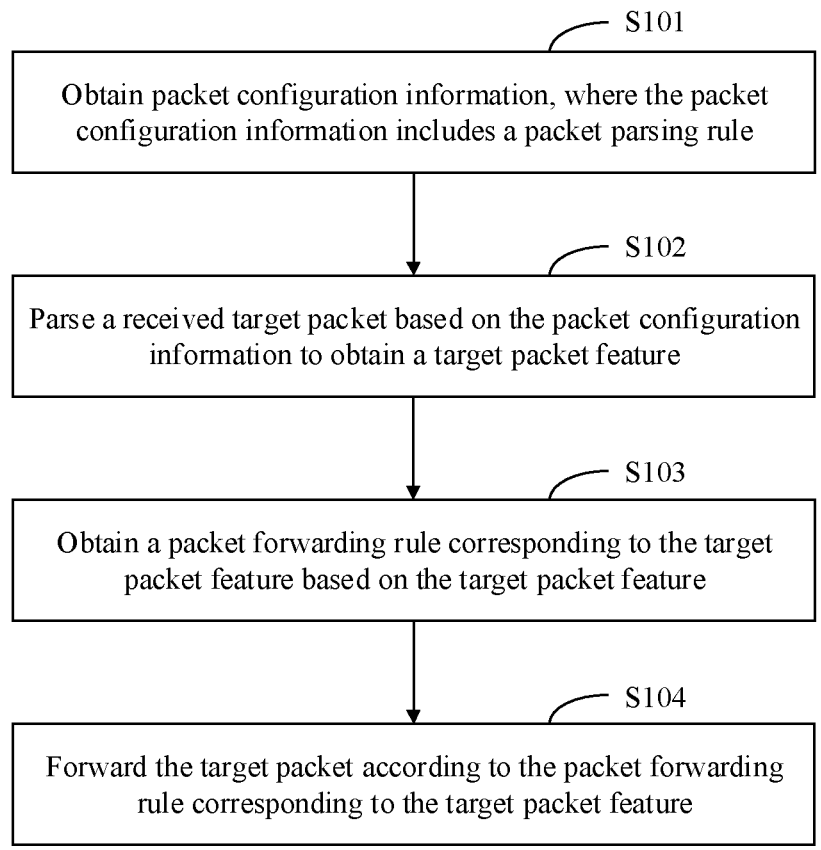
FIG. 3 is a schematic flowchart of a packet forwarding method according to an embodiment of this application.

FIG. 3 is a schematic flowchart of a packet forwarding method according to an embodiment of this application. As shown in FIG. 3, the method is performed by a network device, and includes the following steps.

S101: Obtain packet configuration information, where the packet configuration information includes a packet parsing rule.

For example, the packet configuration information is information used to describe a packet feature and classification, and is more specifically, for example, a configuration file or control instructions. There are a plurality of implementations for obtaining the packet configuration information. For example, a network device on a forwarding plane obtains the packet configuration information from a control plane, or the network device on the forwarding plane directly obtains the input packet configuration information through an external data interface. A specific implementation may be set according to a requirement. A specific implementation method for obtaining the packet configuration information is not limited herein.

In a possible implementation, a carrier of the packet parsing rule is a data dictionary. The data dictionary is a data file used to represent the packet parsing rule. For example, the data dictionary may be a table for determining the packet parsing rule, may be a logical expression for determining the packet parsing rule, or another implementation. This is not specifically limited herein. The data dictionary is set by a user based on a specific requirement for packet forwarding, and a specific form and content of the data dictionary may be determined based on a specific application scenario and an application requirement.

Certainly, it may be understood that the carrier of the packet parsing rule may alternatively be a data file in another form. This is not specifically limited herein.

S102: Parse a received target packet based on the packet configuration information to obtain a target packet feature.

For example, the target packet is packet data sent by an upstream network device and received by the network device on the forwarding plane. More specifically, for example, the upstream network device is a data center, and the network device on the forwarding plane that performs the method provided in this embodiment is a router. The router receives the target packet sent by the data center, and parses the packet based on the data dictionary. The network device on the forwarding plane that performs the method provided in this embodiment may be simultaneously connected to a plurality of upstream network devices, or the upstream network device simultaneously sends a plurality of different types of service data to the network device on the forwarding plane that performs the method provided in this embodiment. Therefore, target packets received by the network device on the forwarding plane correspond to different service data, and correspondingly have different packet features.

Further, the target packet is parsed, and there are a plurality of manners for determining the target packet feature. In a possible implementation, the target packet includes a plurality of protocol fields, and all protocol fields of the target packet and corresponding field content can be parsed according to the packet parsing rule corresponding to the target packet. A packet feature of the target packet may be determined based on all the protocol fields and the corresponding field content. The target packet feature is used to represent content of the target packet, for example, a protocol field and corresponding field content of the target packet.

In another possible implementation, the target packet includes a plurality of protocol fields, and one or more specific protocol fields of the target packet and corresponding field content can be parsed according to the packet parsing rule. A packet feature of the target packet may be determined based on the one or more specific protocol fields and the corresponding field content.

Certainly, the target packet feature may also be determined in another manner. For example, the target packet feature is determined based on a length of the target packet and an identifier corresponding to the target packet. To be specific, the target packet feature is determined based on a length of the target packet recorded in the packet parsing rule or a mapping relationship between the identifier corresponding to the target packet and a packet feature. Examples are not provided herein one by one.

S103: Obtain a packet forwarding rule corresponding to the target packet feature based on the target packet feature.

Specifically, the target packet feature is the packet feature of the target packet. Because different service data includes different packet features, a classification of service data corresponding to the target packet is determined when the packet feature of the target packet is determined. Further, the packet forwarding rule corresponding to the target packet including the packet feature is determined. In this way, different service data can be split.

For example, there are a plurality of methods for determining a corresponding packet forwarding rule based on a packet feature. For example, different packet features each correspond to a unique feature identifier, and the packet forwarding rule corresponding to the packet feature is determined based on a preset mapping table between a feature identifier and a packet forwarding rule. For another example, a corresponding routing forwarding rule is determined based on a specific implementation of the packet feature. More specifically, different packet features are implemented by using different protocol fields and corresponding field content, and the packet forwarding rule is determined based on forwarding rules of one or more protocol fields corresponding to different packet features.

S104: Forward the target packet according to the packet forwarding rule corresponding to the target packet feature.

The packet forwarding rule is a rule for forwarding the target packet to different traffic paths, and there are a plurality of implementation forms of the packet forwarding rule. For example, the packet forwarding rule includes information used to represent a destination MAC address and a destination IP address, and the target packet may be sent to a target address location based on the information.

For example, if a target packet a corresponds to a packet forwarding rule A, the target packet a is forwarded according to the packet forwarding rule A, so that the target packet a is forwarded to a network device corresponding to a MAC address A1, a network address corresponding to an IP address A2, or a port corresponding to a port number A3. Therefore, traffic path scheduling of the target packet a is implemented, and the target packet a can enter an optimal traffic path.

In this application, the packet configuration information including the data dictionary is obtained, and the packet feature is determined based on the data dictionary. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

Figure 4:
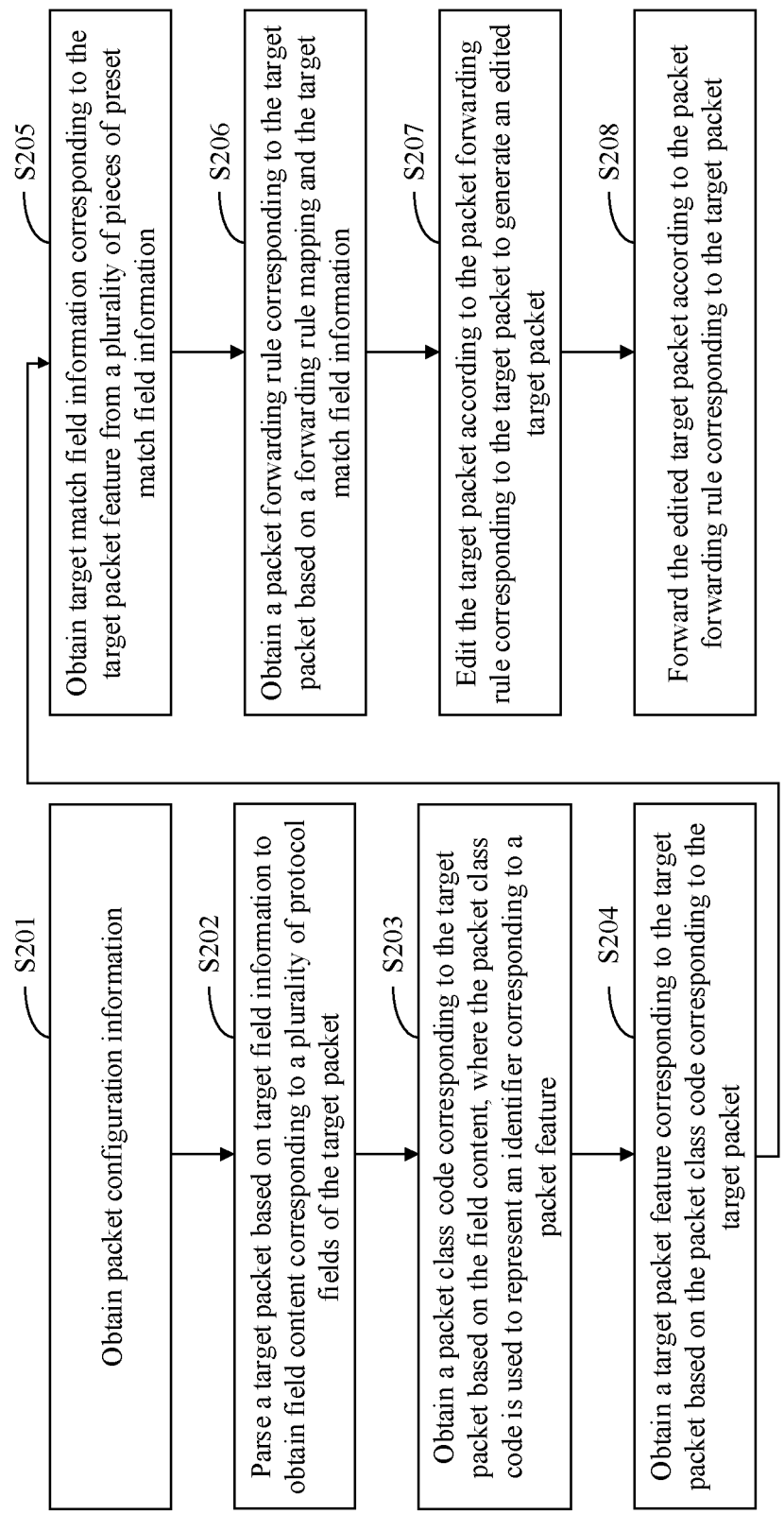
FIG. 4 is a schematic flowchart of another packet forwarding method according to an embodiment of this application.

FIG. 4 is a schematic flowchart of another packet forwarding method according to an embodiment of this application. As shown in FIG. 4, step S102 and step S103 are further described in the packet forwarding method provided in this embodiment based on the packet forwarding method provided in the embodiment in FIG. 3. The method includes the following steps.

S201: Obtain the packet configuration information.

For example, the target packet includes the plurality of protocol fields, the packet configuration information includes the data dictionary, and the data dictionary includes field information. The field information is used to represent locations of the plurality of protocol fields of the packet in the packet.

Figure 5:
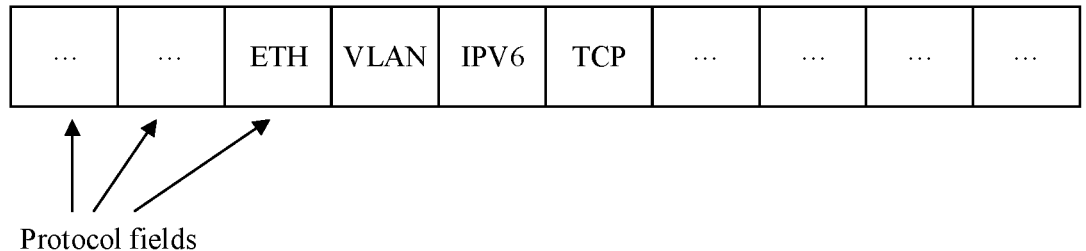
FIG. 5 is a schematic diagram of a structure of a target packet according to an embodiment of this application.

FIG. 5 is a schematic diagram of a structure of the target packet according to an embodiment of this application. As shown in FIG. 5, the target packet includes the plurality of protocol fields, for example, an Ethernet (ETH) header field and a virtual local area network (VLAN) header field. Specific content and a forwarding rule in the target packet may be determined based on the protocol fields. In other words, different target packets include different protocol fields, and a location of each protocol field in the target packet may be determined based on the field information in the data dictionary. For example, target field information may include: In a target packet A, a $64^{th}$ byte to a $72^{nd}$ byte are information about a protocol field Aa, and a $73^{rd}$ byte and a $74^{th}$ byte are information about a protocol field Ab.

The data dictionary further includes identification information, and the identification information is used to represent a mapping relationship between the plurality of protocol fields and a packet feature. The packet feature is information used to represent features of different service data. Based on different implementation forms of the packet feature, there may be different implementation forms of the mapping relationship between the protocol fields and the packet feature. For example, the packet feature is represented by a specific identifier. In this case, the identification information is information representing a mapping relationship between the plurality of protocol fields and the specific identifier. For example, the plurality of protocol fields include protocol fields Aa, Ab, and Ac, and it may be determined that an identifier of a packet feature corresponding to the protocol fields Aa, Ab, and Ac is #01, so that the mapping relationship between the plurality of protocol fields and the packet feature is established. In addition, it may be understood that, based on different implementation forms of the packet feature, a specific implementation form of the corresponding identification information and a specific implementation of establishing the mapping relationship between the plurality of protocol fields and the packet feature may also be different. This is not specifically limited herein.

In a possible implementation, the identification information is a packet class code, the packet class code is used to represent an identifier corresponding to a packet feature, and there is a one-to-one mapping relationship between the packet class code and the packet feature.

In this application, the field information used to parse a structure of the target packet and the identification information used to determine mapping relationships between different target packets and different packet features are set in the data dictionary, so that conversion between the target packet and the packet feature is implemented. Because the data dictionary may be preset by a user, flexibly customizing packet forwarding rules corresponding to different protocol fields by the user is implemented, and multi-scenario adaptation performance of the packet forwarding method provided in this application is improved.

S202: Parse the target packet based on the target field information to obtain field content corresponding to the plurality of protocol fields of the target packet.

For example, locations of all protocol fields included in the target packet may be determined based on the field information, and then field content corresponding to each protocol field location is parsed. Specifically, for example, it is recorded in the field information that a MAC address field is from a location of a $64^{th}$ byte to a location of a $69^{th}$ byte in the target packet, and this content in the target packet is parsed to obtain a specific MAC address, for example, 0000.0c12.3456. Certainly, it may be understood that when the protocol fields are different, for example, when the protocol fields are an Ethernet type or IP header fields, corresponding protocol content and representation manners of the content are different accordingly. Examples are not provided herein one by one.

S203: Obtain the packet class code corresponding to the target packet based on the field content, where the packet class code is used to represent the identifier corresponding to the packet feature.

S204: Obtain the target packet feature corresponding to the target packet based on the packet class code corresponding to the target packet.

Packet features corresponding to different target packets each are represented by a plurality of protocol fields in the target packet. Therefore, target packets including different packet features need to be classified, to split the target packets corresponding to different service data. That is, the target packets are classified based on field content corresponding to the plurality of protocol fields. Each class corresponds to one packet class code, to distinguish target packets including different packet features. A specific manner of determining the packet class code may be implemented based on an actual requirement. For example, a correspondence between the target packets including different field content and packet class codes is determined based on a preset mapping relationship.

In this application, the target packet is parsed to obtain the field content corresponding to the protocol fields, and the packet class code is determined based on the field content. Different protocol fields can represent features of different service data. For example, the data is traffic dedicated to an application, and a port corresponding to the application is different from a port corresponding to another application. Therefore, different application traffic can be split based on field content about the port of the protocol fields, to improve traffic control precision.

In a possible implementation, different packet features correspond to different match field information, and the match field information represents a key protocol field in a plurality of protocol fields that is used to determine a packet feature. The configuration information further includes a forwarding rule mapping, and the forwarding rule mapping is used to represent a mapping relationship between the match field information and a packet forwarding rule.

S205: Obtain target match field information corresponding to the target packet feature from a plurality of pieces of preset match field information.

For example, the match field information is used to represent a key protocol field in the plurality of protocol fields of the target packet, and the key protocol field may be used to determine the packet feature. The target packet includes the plurality of protocol fields, and a part of protocol fields of different target packets are the same, or do not affect setting of a traffic path. Therefore, when different target packets are distinguished and corresponding packet features are determined, there is no need to compare all protocol fields between the target packets, and only key protocol fields that affect a packet forwarding path need to be matched.

Figure 6:
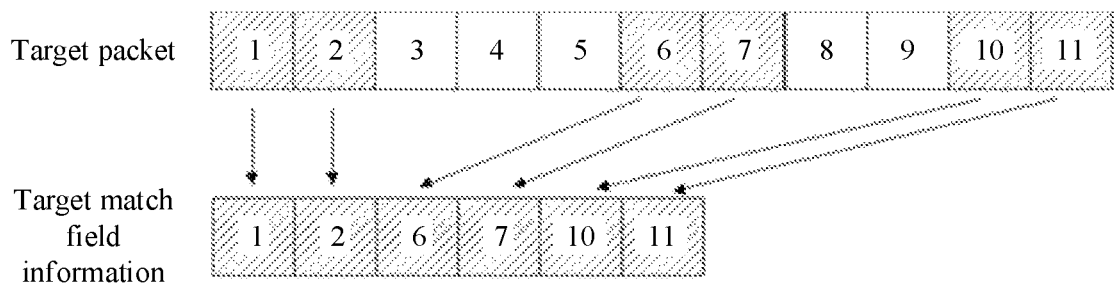
FIG. 6 is a schematic diagram of target match field information according to an embodiment of this application.

FIG. 6 is a schematic diagram of the target match field information according to an embodiment of this application. As shown in FIG. 6, the target match field information is one of the plurality of pieces of match field information. The match field information may be an indication identifier, and is used to represent a location of the key protocol field in all protocol fields. Based on the target match field information, extraction is started from a first byte, a sixth byte, and a tenth byte separately, to extract 2 bytes each time, and obtain 6 bytes of data in total. Then a mask value is obtained. If there is no mask, mask calculation is not performed. For example, the match field information corresponding to the packet feature may be obtained based on a preset mapping table. For example, for a target packet 01 corresponding to a target packet feature #01, it is determined based on the preset mapping table that corresponding target match field information is [1, 2, 6, 7, 10, 11], that is, protocol fields in locations [1, 2, 6, 7, 10, 11] are key protocol fields of the target packet 01.

S206: Obtain the packet forwarding rule corresponding to the target packet based on the forwarding rule mapping and the target match field information.

The forwarding rule mapping is a preset logical mapping relationship, and may be used to determine a corresponding packet forwarding rule based on match field information. For example, the corresponding packet forwarding rule is determined based on the target match field information, and the packet forwarding rule corresponds to the target packet. For example, the forwarding rule mapping may be set based on a specific requirement of the user. For example, the forwarding rule mapping is a mapping table or a mapping logical expression.

In this application, a specific method for determining the packet feature is provided by obtaining the match field information corresponding to the packet feature. Because structures of different packets are not completely the same, it is difficult to directly represent a packet feature for packets that comply with different packet protocols. Feature extraction can be implemented based on match field information and corresponding key protocol fields for the packets that comply with different protocols. This improves compatibility and flexibility of processing different packets.

Figure 7:
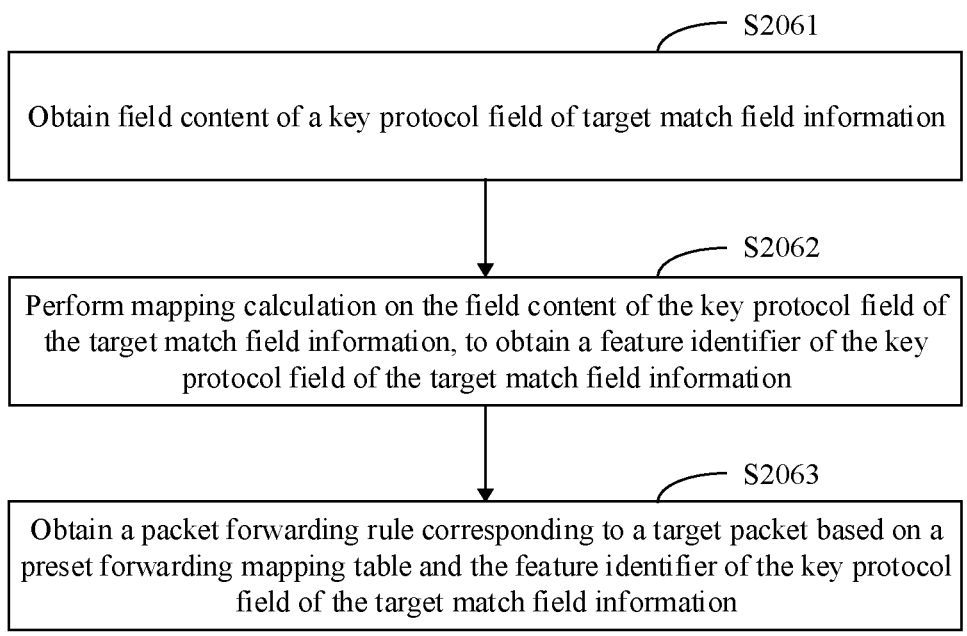
FIG. 7 is a flowchart of an implementation of step S206 in the embodiment shown in FIG. 4.

As shown in FIG. 7, in a possible implementation, the forwarding rule mapping is a table representing a forwarding mapping between different feature identifiers and different packet forwarding rules. S206 includes three specific implementation steps: S2061, S2062, and S2063.

S2061: Obtain field content of the key protocol field of the target match field information.

Specifically, the key protocol field may be determined based on the target match field information, and then the field content is determined. The key protocol field determines a final forwarding path of the target packet. Therefore, the key protocol field needs to be parsed to obtain the corresponding field content, so as to support subsequent forwarding of the target packet.

In a possible implementation, the match field information includes location information, and the location information is used to represent a location of the key protocol field in the target packet. The obtaining field content of the key protocol field corresponding to the target match field information includes: determining a field area of the key protocol field in the target packet based on the location information, and determining packet content in the field area as the field content.

For example, more specifically, the location information includes an offset value and a length value. The offset value is used to represent a start location or an end location of the key protocol field. The length value is used to represent a length of the key protocol field. The location of the key protocol field corresponding to the match field information may be completely determined based on the offset value and the length value. Further, the packet content in the field area is determined as the field content.

S2062: Perform mapping calculation on the field content of the key protocol field of the target match field information, to obtain a feature identifier of the key protocol field of the target match field information.

For example, the mapping calculation includes one or more of hash (hash) calculation, linear transformation calculation, or longest match calculation. Hash calculation is used as an example. The key protocol field is located and parsed to obtain the field content corresponding to the key protocol field. For example, the field content may be a character string or an identifier. Hash calculation is performed on the character string or the identifier to irreversibly obtain a corresponding hash value. Different hash values correspond to different identifiers, namely, feature identifiers. Table 1 is a correspondence table between content of a key protocol field and a feature identifier. As shown in Table 1, a corresponding feature identifier may be obtained through mapping calculation on the content of the key protocol field, and a subsequent packet forwarding rule is determined based on the feature identifier. ETH, SVLAN, CVLAN, IP, MPLS, PPPOE, UDP, and VXLAN are protocol headers of different protocol fields, and correspond to content of key protocol fields. For example, the key protocol field may be stored in a packet format stack, and each feature identifier may be a number representing a corresponding packet format stack, that is, the feature identifier corresponds to one bit. For example, the bit is set to 1, indicating that a key protocol field corresponding to the feature identifier is determined.

TABLE 1

| Key protocol field | Feature identifier |
|---|---|
| ETH | 0 |
| ETH + SVLAN | 1 |
| ETH + SVLAN + CVLAN | 2 |
| ETH + IP | 3 |
| ETH + MPLS | 4 |
| ETH + MPSL + IP | 5 |
| ETH + SVLAN + PPPOE | 6 |
| ETH + SVLAN + MPLS | 7 |
| ETH + SVLAN + CVLAN + MPLS | 8 |
| ETH + SVLAN + CVLAN + MPLS + IP | 9 |
| ETH + SVLAN + CVLAN + IP + UDP | 10 |
| ETH + SVLAN + CVLAN + IP + TCP | 11 |
| ETH + IP + UDP + VXLAN | 12 |

In a possible implementation, mapping calculation on the field content of the key protocol field may be specifically implemented by using a flow classification tree (FCT). Packet encapsulation is implemented layer by layer from an application layer to a physical layer. Therefore, when field content is parsed, protocol fields of a packet are continuously parsed until a specific feature identifier corresponding to a packet feature is determined, and then a packet forwarding rule is determined. For example, field content corresponding to a key protocol field of an address resolution protocol (ARP) packet is 0x0806. In this case, the packet is directly sent to a CPU for ARP processing. For another example, field content corresponding to a key protocol field of a common IP packet is 0x800. In this case, the packet is sent to a network layer for processing.

S2063: Obtain the packet forwarding rule corresponding to the target packet based on a preset forwarding mapping table and the feature identifier of the key protocol field of the target match field information.

The forwarding mapping table is information representing a mapping relationship between a feature identifier and a corresponding packet forwarding rule, and different feature identifiers correspond to content of different key protocol fields. Therefore, forwarding rules corresponding to different feature identifiers are different. For example, as shown in Table 1, when the key protocol field corresponds to "ETH+IP", packet information needs to be sent to a corresponding forwarding network address through the network layer; and when the key protocol field corresponds to "ETH+SVLAN+CVLAN+IP+UDP", packet information needs to be sent to a corresponding forwarding port. In other words, different feature identifiers correspond to different forwarding rules, and the mapping relationship between the feature identifier and the forwarding rule may be determined based on the forwarding mapping table. In this way, the packet forwarding rule corresponding to the feature identifier is determined. The forwarding mapping table is a preset configuration file, and may be preset by a user based on a specific application scenario and requirement, or may be determined by the network device through calculation based on another parameter.

S207: Edit the target packet according to the packet forwarding rule corresponding to the target packet to generate an edited target packet.

For example, the edited target packet is optimized packet information obtained by editing the target packet according to the packet forwarding rule. Data forwarding effect of the edited target packet may be consistent with or better than that of the target packet. Editing the target packet indicates editing content of a protocol field in the packet, so that the target packet after editing, that is, the edited target packet, is forwarded by using an optimized forwarding path, to implement traffic adjustment, traffic balancing, and the like. More specifically, for example, the target packet is edited according to the packet forwarding rule and a forwarding network address of the target packet is modified, to form the edited target packet that matches a forwarding network address corresponding to the packet feature of the target packet in the packet forwarding rule, and the edited target packet is forwarded. This can meet a traffic adjustment requirement of corresponding service traffic, balance traffic load, and improve packet forwarding efficiency.

Figure 8:
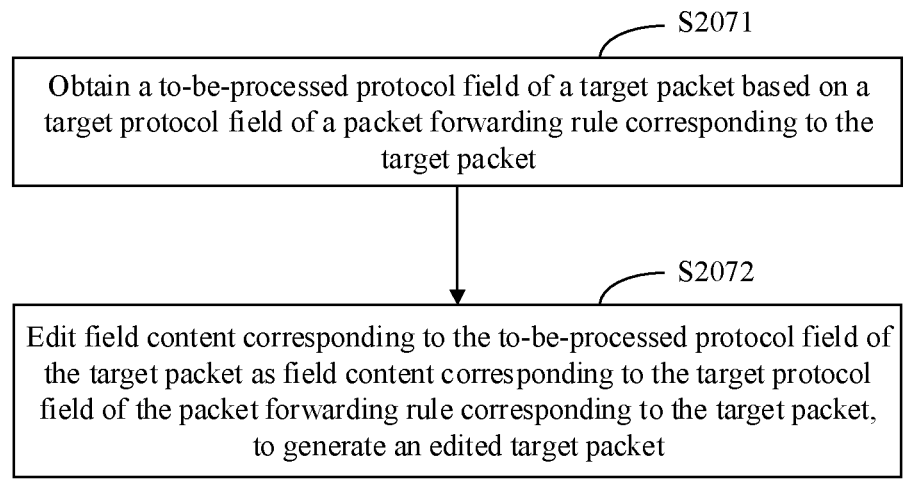
FIG. 8 is a flowchart of an implementation of step S207 in the embodiment shown in FIG. 4.

For example, as shown in FIG. 8, in a possible implementation, the packet forwarding rule includes a target protocol field and field content corresponding to the target protocol field. S207 includes two specific implementation steps: S2071 and S2072.

S2071: Obtain a to-be-processed protocol field of the target packet based on the target protocol field of the packet forwarding rule corresponding to the target packet.

For example, the target protocol field is a protocol field that is recorded in the packet forwarding rule and used for editing the target packet, for example, "protocol field Vlan". The target protocol field is edited, so that the edited target packet can be generated. The to-be-processed field is a protocol field of the target packet that needs to be edited based on the target protocol field. The target protocol field may be a protocol field that already exists in the target packet, or may be a protocol field that does not exist in the target packet. In other words, different editing operations such as addition, modification, and deletion may be performed on a protocol field of the target packet based on the target protocol field.

S2072: Edit field content corresponding to the to-be-processed protocol field of the target packet as the field content corresponding to the target protocol field of the packet forwarding rule corresponding to the target packet, to generate the edited target packet.

For example, based on the field content corresponding to the target protocol field such as "Vlan=2", a protocol field "Vlan" of the target packet is correspondingly assigned to "Vlan=2". If there is no "Vlan" protocol field in the target packet, the "Vlan" protocol field is added in the target packet and then a value is assigned to the "Vlan" protocol field.

In a possible implementation, the modifying field content corresponding to the to-be-processed protocol field to the field content corresponding to the target protocol field includes:

obtaining preset field content operation information, where the field content operation information includes an operation action item, an operand length item, an operand offset item, and an operation value item, the operation action item is used to represent an operation action on the to-be-processed protocol field, the operand length item is used to represent a length of the to-be-processed protocol field in the target packet, the operand offset item is used to represent a start location of the to-be-processed protocol field in the target packet, and the operation value item is used to represent the field content corresponding to the to-be-processed protocol field; and modifying the field content corresponding to the to-be-processed protocol field to the field content corresponding to the target protocol field based on the operation action item, the operand length item, the operand offset item, and the operation value item.

For example, the operation action item includes one or more of addition, deletion, modification or function computing.

The function computing is an operation action of calculating the field content of the to-be-processed protocol field. For example, the field content is time to live (TTL). The TTL is calculated and adjusted through function computing, to implement a more complex operation action, and meet different service requirements.

In this application, the preset field content operation information is obtained, and one operation action is implemented based on feature values of four dimensions: the operation action item, the operand length item, the operand offset item, and the operation value item in field content operation information. This effectively improves efficiency and accuracy of modifying the field content corresponding to the target protocol field compared with a logical expression method such as a regular expression.

S208: Forward the edited target packet according to the packet forwarding rule corresponding to the target packet.

Figure 9:
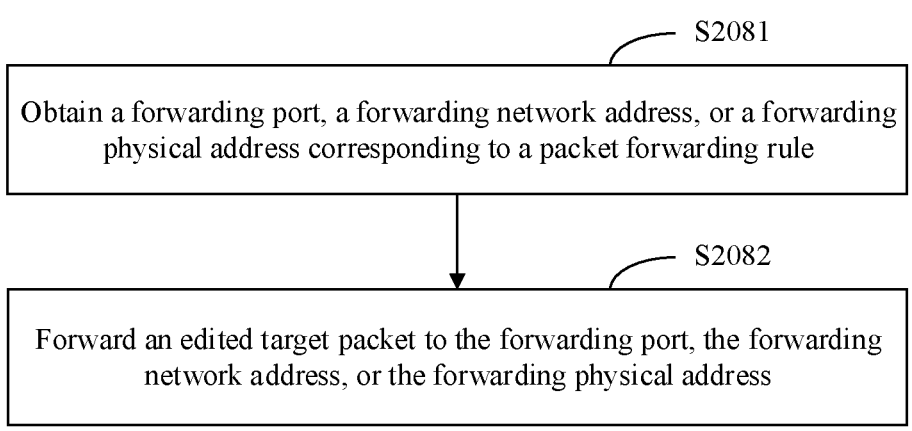
FIG. 9 is a flowchart of an implementation of step S208 in the embodiment shown in FIG. 4.

For example, as shown in FIG. 9, in a possible implementation, S208 includes two specific implementation steps: S2081 and S2082.

S2081: Obtain a forwarding port, a forwarding network address, or a forwarding physical address corresponding to the packet forwarding rule.

S2082: Forward the edited target packet to the forwarding port, the forwarding network address, or the forwarding physical address.

Figure 10:
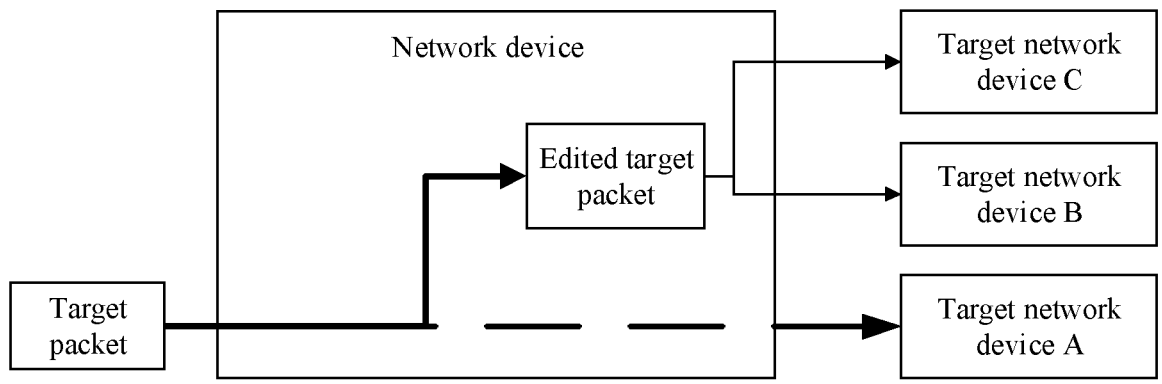
FIG. 10 is a schematic diagram of forwarding a second packet according to an embodiment of this application.

For example, FIG. 10 is a schematic diagram of forwarding the edited target packet according to an embodiment of this application. In FIG. 10, a dashed line indicates a forwarding path through which an original target packet is directly forwarded after being processed in a related technology, and a solid line indicates a forwarding path of the edited target packet obtained by performing the packet forwarding method provided in this embodiment of this application. The edited target packet adjusts and controls a traffic path according to the packet forwarding rule, so that packets corresponding to different service data are forwarded through different paths. This implements traffic control and traffic balancing of the application layer.

In this application, the target packet is edited according to the packet forwarding rule to generate the edited target packet, and the edited target packet is forwarded. Because a traffic path of the edited target packet has been optimized compared with that of the target packet, transmission efficiency of the edited target packet is better. This avoids data transmission congestion caused by load imbalance, and implements data traffic split control. Conventional packet forwarding is processed based on the network device on the forwarding plane. In this case, software and hardware usually need to be upgraded from a bottom layer when a traffic path needs to be optimized or modified, causing huge upgrade costs. In the packet forwarding method provided in this embodiment of this application, a forwarding rule of a corresponding data plane is determined based on a service data feature, so that the forwarding rule of the data plane can change with an uploaded application. In addition, packet forwarding is implemented based on the original network device on the forwarding plane. This can implement more flexible packet forwarding of different protocols, and reduce the upgrade costs of the network device.

Figure 11:
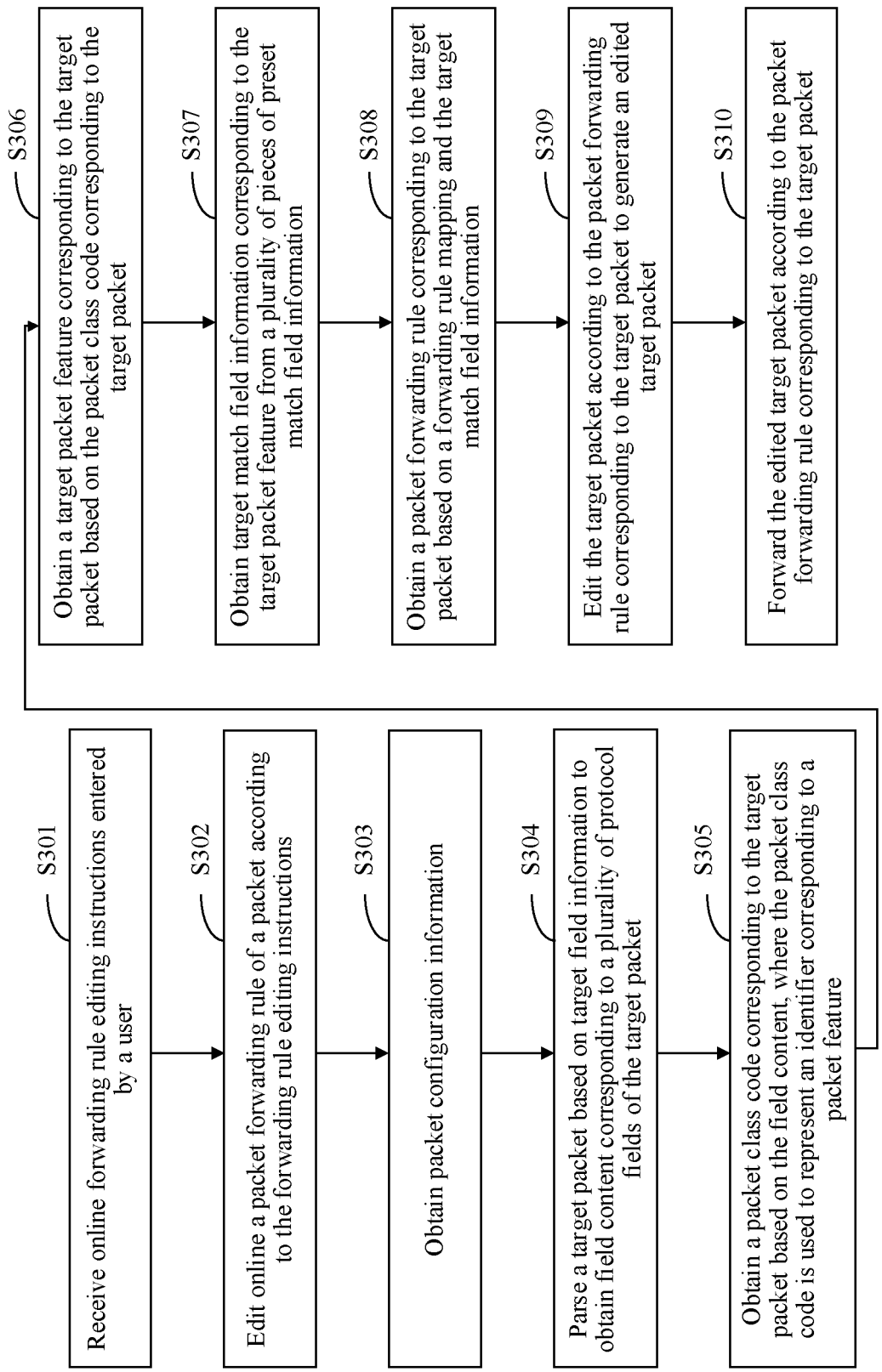
FIG. 11 is a schematic flowchart of still another packet forwarding method according to an embodiment of this application.

FIG. 11 is a schematic flowchart of still another packet forwarding method according to an embodiment of this application. As shown in FIG. 11, a step of receiving input rule editing instructions is added before step S201 in the packet forwarding method provided in this embodiment based on the packet forwarding method provided in the embodiment in FIG. 3. The method includes the following steps.

S301: Receive online forwarding rule editing instructions entered by the user.

For example, the forwarding rule editing instructions are instruction information that is set by the user based on a specific application scenario and a service requirement, so that the network device on the forwarding plane can forward the packet according to a forwarding rule required by the user. Service data received by the network device on the forwarding plane varies greatly in different application scenarios, for example, network video data, real-time voice data, and online game data. Different service data can hardly to be processed according to a unified forwarding rule. Receiving the forwarding rule editing instructions entered by the user allows the user to edit the forwarding rule based on a specific application requirement, so that the network device can more flexibly adapt to different application scenarios.

S302: Edit online the packet forwarding rule of the packet according to the forwarding rule editing instructions.

In a possible implementation, the forwarding rule editing instructions are parsed online based on preset grammatical information to determine a configuration table corresponding to the forwarding rule editing instructions. The configuration table corresponds to different packet features, and the packet forwarding rule is edited based on the configuration table.

For better description, the following uses a more specific embodiment to describe a process of parsing online the forwarding rule editing instructions and determining the configuration table corresponding to the forwarding rule editing instructions. The packet includes the target packet, and the following uses an example of modifying the forwarding rule of the target packet.

The user creates a socket interface to the network device by entering forwarding rule editing instructions. The network device receives the forwarding rule editing instructions through the socket interface and parses the instructions, to obtain a configuration table. For example, the configuration table is generated by using a script in JSON format, and script syntax is to apply for a hash table whose ID is 0. A matching rule between the configuration table and packet information is obtaining first 6 bytes of the packet. A specification of the configuration table is 1000, the configuration table corresponds to a specific type of a packet feature, and the packet feature is related to service data. An Ethernet packet including a Vlan tag is used as an example. For example, the configuration table is created as follows:

```
{
PKT_TYPE = 1, TABLE_TYPE = HASH,
TABLE_LONGKEY = [0: 6], TABLE_ID = 0,
TABLE,SPEC = 1000
}
```

PKT_TYPE indicates a packet type, TABLE_TYPE indicates a type of the applied configuration table, TABLE LONGKEY indicates the packet matching rule, TABLE_ID indicates the ID of the configuration table, and TABLE, SPEC indicates the specification of the configuration table. A specific implementation and an expression of the configuration table are determined by a preset grammatical information. In this case, a specific form of the configuration table may alternatively be implemented in another manner, which is not limited herein. The forwarding rule editing instructions implement editing online the packet forwarding rule of the target packet through the foregoing process.

The forwarding rule editing instructions may further include deleting content of the configuration table to release resources occupied by the configuration table. For example, deleting the configuration table is as follows:

```
{
DELETE TABLE_ID = 0
}
```

For example, the configuration table further includes first keyword information and second keyword information, the first keyword information is a current forwarding rule corresponding to the target packet, and the second keyword information is used to represent an expected forwarding rule corresponding to the target packet. Specific content for editing the forwarding rule may be determined based on difference item comparison between the first keyword information and the second keyword information. For example, when the first keyword information includes "IP address=10.0.0.1", and the second keyword information includes "IP address=10.0.0.2", it may be determined that the corresponding packet forwarding rule is edited as "forward the packet to the IP address=10.0.0.2 when the forwarding rule is met".

A manner for processing a specific type of target packet may be determined based on the content of the configuration table. Therefore, forwarding rule editing information representing the content of the configuration table may be obtained by parsing the content of the configuration table, and then packet forwarding rules corresponding to different types of target packets may be edited based on the forwarding rule editing information.

Figure 12:
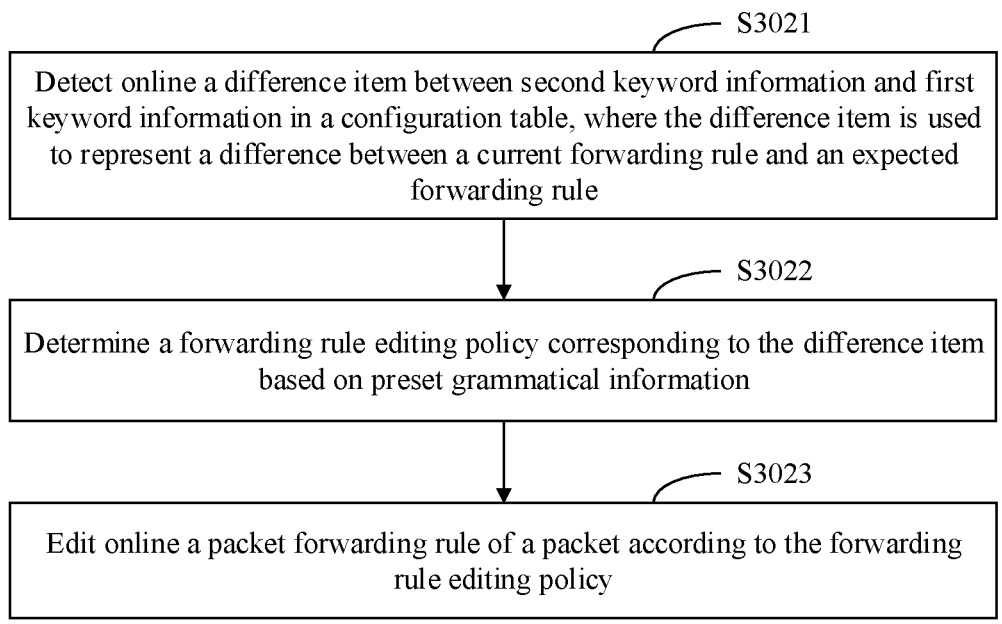
FIG. 12 is a flowchart of an implementation of step S302 in the embodiment shown in FIG. 11.

For example, as shown in FIG. 12, in a possible implementation, S302 includes three specific implementation steps: S3021, S3022, and S3023.

S3021: Detect online a difference item between the second keyword information and the first keyword information in the configuration table, where the difference item is used to represent a difference between the current forwarding rule and the expected forwarding rule.

S3022: Determine a forwarding rule editing policy corresponding to the difference item based on the preset grammatical information.

S3023: Edit online the packet forwarding rule of the packet according to the forwarding rule editing policy.

The following describes S3021 to S3023 by using a more specific embodiment.

The configuration table includes the following:

```
{
BEFORE : Dmac > Smac >
Packettype > Vlantype > Vlantag;
AFTER : Dmac > Smac > Packettype >
Vlantype > Vlantag = 3&0x0FFF
}
```

"BEFORE" is the first keyword information, and "AFTER" is the second keyword information. "Dmac >Smac >Packettype >Vlantype >Vlantag" in the first keyword information and the second keyword information separately represents specific field content of a protocol field of the target packet, and the field content may be defined based on the data dictionary. This is not specifically limited herein. Symbols ">", "=" and a relationship between the symbols and field content are set by the preset grammatical information. Therefore, a specific form of the forwarding rule editing instructions may alternatively be implemented by arranging another symbol and field content. This is not limited herein. "3&0x0FFF" is an expression with formula calculation, and indicates that Vlantag occupies 2 bytes in which values are assigned to only 12 bits, and the other 4 bits remain original values. That is, a value of 3 is assigned to "Vlantag". The forwarding rule editing policy, that is, a piece of instruction information whose content is "assign a value of 3 to Vlantag of a packet" may be determined by using the forwarding rule editing instructions, to modify specific content of a specific forwarding rule. Certainly, it may be understood that after the forwarding rule editing instructions entered by the user are received, instruction information needs to be compiled, converted into a format that can be identified and processed by hardware units such as a processor, a controller, or a chip in the network device, and stored in a storage medium in the network device. In this way, the packet is forwarded according to a specific forwarding rule without relying on instructions of the control plane.

In this application, the forwarding rule editing instructions entered by the user are received, and the forwarding rule is edited online, so that the forwarding rule of the network device may be edited online directly through a user interface at the application layer. In this way, a debugging operation such as updating or recompiling on the network device on the forwarding plane is not needed. This improves efficiency of adapting to different service data, reduces execution costs of traffic path optimization of the existing network device on the forwarding plane, and improves application flexibility and scope.

S303: Obtain the packet configuration information.
S304: Parse the target packet based on the target field information to obtain field content corresponding to the plurality of protocol fields of the target packet.
S305: Obtain the packet class code corresponding to the target packet based on the field content, where the packet class code is used to represent the identifier corresponding to the packet feature.
S306: Obtain the target packet feature corresponding to the target packet based on the packet class code corresponding to the target packet.
S307: Obtain the target match field information corresponding to the target packet feature from the plurality of pieces of preset match field information.
S308: Obtain the packet forwarding rule corresponding to the target packet based on the forwarding rule mapping and the target match field information.
S309: Edit the target packet according to the packet forwarding rule corresponding to the target packet to generate the edited target packet.
S310: Forward the edited target packet according to the packet forwarding rule corresponding to the target packet.

In this embodiment, implementations of S303 to S310 are the same as implementations of S201 to S208 in the embodiment shown in FIG. 4 of this application, and details are not described herein again.

The foregoing describes in detail the packet forwarding methods according to the embodiments of this application. The following describes in detail a packet forwarding apparatus according to an embodiment of this application.

Figure 13:
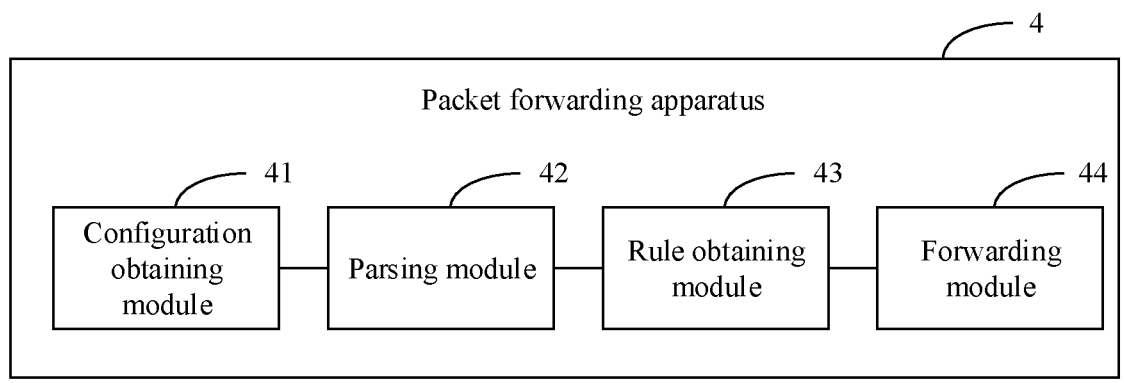
FIG. 13 is a schematic block diagram of a packet forwarding apparatus according to an embodiment of this application.

In an example, FIG. 13 is a schematic block diagram of the packet forwarding apparatus according to an embodiment of this application. The packet forwarding apparatus 4 in this embodiment of this application may be the network device in the foregoing method embodiments, or may be one or more chips in the network device. The packet forwarding apparatus 4 may be configured to perform some or all functions of the network device in the foregoing method embodiments. The packet forwarding apparatus 4 may include the following modules.

A configuration obtaining module 41 is configured to obtain packet configuration information, where the packet configuration information includes a packet parsing rule. The configuration obtaining module 41 may perform step S101 in the method shown in FIG. 3, step S201 in the method shown in FIG. 4, or step S303 in the method shown in FIG. 11.

A parsing module 42 is configured to parse a received target packet based on the packet configuration information to obtain a target packet feature, where the target packet feature is used to represent content of the target packet. The parsing module 42 may perform step S102 in the method shown in FIG. 3.

A rule obtaining module 43 is configured to obtain a packet forwarding rule corresponding to the target packet based on the target packet feature. The rule obtaining module 43 may perform step S103 in the method shown in FIG. 3.

A forwarding module 44 is configured to forward the target packet according to the packet forwarding rule corresponding to the target packet. The forwarding module 44 may perform step S104 in the method shown in FIG. 3.

In this application, the packet configuration information including the packet parsing rule is obtained, and the packet feature is determined according to the packet parsing rule. Because packet features of different service data are different, the different service data is distinguished based on the different packet features, and is forwarded according to different forwarding rules. This implements forwarding control of the different service data, improves service data forwarding efficiency and adjustment precision, and avoids low service data transmission efficiency and incapability of splitting the different service data.

In a possible implementation, the target packet includes a plurality of protocol fields, the packet configuration information includes target field information, and the target field information is used to represent locations of the plurality of protocol fields of the target packet in the target packet. The parsing module 42 is specifically configured to: parse the target packet based on the target field information to obtain field content corresponding to the plurality of protocol fields of the target packet; obtain a packet class code corresponding to the target packet based on the field content, where the packet class code is used to represent an identifier corresponding to a packet feature; and obtain the target packet feature corresponding to the target packet based on the packet class code corresponding to the target packet. In this case, the parsing module 42 may perform step S202 to step S204 in the method shown in FIG. 4, or step S304 to step S306 in the method shown in FIG. 11.

In this application, the target packet is parsed based on the packet configuration information to obtain the field content corresponding to the protocol fields. The packet class code is obtained based on the field content. The corresponding target packet feature is determined based on the packet class code. Different protocol fields can represent features of different service data. For example, data is traffic dedicated to an application, and a port corresponding to the application is different from a port corresponding to another application. Therefore, different application traffic can be split based on field content of the protocol fields, to improve traffic control precision.

In a possible implementation, the target packet includes the plurality of protocol fields, and the packet configuration information further includes a forwarding rule mapping. The rule obtaining module 43 is specifically configured to: obtain target match field information corresponding to the target packet feature from a plurality of pieces of preset match field information; and obtain the packet forwarding rule corresponding to the target packet based on the forwarding rule mapping and the target match field information, where the forwarding rule mapping is used to represent a mapping relationship between the target match field information and the packet forwarding rule corresponding to the target packet. In this case, the rule obtaining module 43 may perform step S205 and step S206 in the method shown in FIG. 4, or step S307 and step S308 in the method shown in FIG. 11.

In this application, a specific method for obtaining the packet feature is provided by obtaining the match field information corresponding to the target packet feature. Because structures of different packets are not completely the same, it is difficult to directly represent a packet feature for packets that comply with different packet protocols. Feature extraction can be implemented based on match field information and corresponding key protocol fields for the packets that comply with different protocols. This improves compatibility and flexibility of processing different packets.

In a possible implementation, the target match field information includes a key protocol field that is in the plurality of protocol fields of the target packet and that is used to obtain the target packet feature. When obtaining the packet forwarding rule corresponding to the target packet based on the forwarding rule mapping and the target match field information, the rule obtaining module 43 is specifically configured to: obtain field content of the key protocol field of the target match field information; perform mapping calculation on the field content of the key protocol field of the target match field information, to obtain a feature identifier of the key protocol field of the target match field information; and obtain the packet forwarding rule corresponding to the target packet based on a preset forwarding mapping table and the feature identifier of the key protocol field of the target match field information, where the forwarding mapping table is used to represent a mapping relationship between the feature identifier and the packet forwarding rule. In this case, the rule obtaining module 43 may perform step S2061 to step S2063 in the method shown in FIG. 7.

In a possible implementation, the mapping calculation includes one or more of hash calculation, linear transformation calculation, or longest match calculation.

In a possible implementation, the match field information further includes location information, and the location information is used to represent a location of the key protocol field in the packet. When obtaining field content of the key protocol field of the target match field information, the rule obtaining module 43 is specifically configured to: obtain a field area of the key protocol field of the target match field information in the target packet based on the location information in the target match field information, and determine packet content in the field area as the field content of the key protocol field of the target match field information. In this case, the rule obtaining module 43 may perform step S2061 in the method shown in FIG. 7.

In a possible implementation, the location information includes an offset value and a length value. The offset value is used to represent a start location or an end location of the key protocol field. The length value is used to represent a length of the key protocol field.

In a possible implementation, the forwarding module 44 is specifically configured to: edit the target packet according to the packet forwarding rule corresponding to the target packet to generate an edited target packet, and forward the edited target packet according to the packet forwarding rule corresponding to the target packet. In this case, the forwarding module 44 may perform step S207 and step S208 in the method shown in FIG. 4, or step S309 and step S310 in the method shown in FIG. 11.

In this application, the target packet is edited according to the packet forwarding rule to generate a second packet, and the second packet is forwarded. Because a traffic path of the second packet has been optimized compared with that of the target packet, transmission efficiency of the second packet is better. This avoids data transmission congestion caused by load imbalance, and implements data traffic split control. Conventional packet forwarding is processed based on a network device on a forwarding plane. In this case, software and hardware usually need to be upgraded from a bottom layer when a traffic path needs to be optimized or modified, causing huge upgrade costs. In the packet forwarding method provided in this embodiment of this application, a corresponding optimized traffic path, that is, a traffic path corresponding to the second packet may be directly formed based on a service data feature, and packet forwarding is implemented based on the original network device on the forwarding plane. This can implement more flexible packet forwarding of different protocols, and reduce the upgrade costs of the network device.

In a possible implementation, the packet forwarding rule includes a target protocol field and field content corresponding to the target protocol field. When editing the target packet according to the packet forwarding rule corresponding to the target packet to generate an edited target packet, the forwarding module 44 is specifically configured to: obtain a to-be-processed protocol field of the target packet based on the target protocol field of the packet forwarding rule corresponding to the target packet; and edit field content corresponding to the to-be-processed protocol field of the target packet as the field content corresponding to the target protocol field of the packet forwarding rule corresponding to the target packet, to generate the edited target packet. In this case, the forwarding module 44 may perform step S2071 and step S2072 in the method shown in FIG. 8.

In a possible implementation, when editing field content corresponding to the to-be-processed protocol field of the target packet as the field content corresponding to the target protocol field of the packet forwarding rule corresponding to the target packet, to generate the edited target packet, the forwarding module 44 is specifically configured to: obtain preset field content operation information, where the field content operation information includes an operation action item, an operand length item, an operand offset item, and an operation value item, the operation action item is used to represent an operation action on the to-be-processed protocol field, the operand length item is used to represent a length of the to-be-processed protocol field in the target packet, the operand offset item is used to represent a start location of the to-be-processed protocol field in the target packet, and the operation value item is used to represent the field content corresponding to the to-be-processed protocol field; and edit, based on the operation action item, the operand length item, the operand offset item, and the operation value item, the field content corresponding to the to-be-processed protocol field as the field content corresponding to the target protocol field of the packet forwarding rule corresponding to the target packet, to generate the edited target packet. In this case, the forwarding module 44 may perform step S2072 in the method shown in FIG. 8.

In this application, the preset field content operation information is obtained, and one operation action is implemented based on feature values of four dimensions: the operation action item, the operand length item, the operand offset item, and the operation value item in field content operation information. This effectively improves efficiency and accuracy of modifying the field content corresponding to the target protocol field compared with a logical expression method such as a regular expression.

In a possible implementation, the operation action item includes one or more of addition, deletion, modification or function computing.

In a possible implementation, when forwarding the edited target packet according to the packet forwarding rule corresponding to the target packet, the forwarding module 44 is specifically configured to: obtain a forwarding port that corresponds to the packet forwarding rule corresponding to the target packet, and send the edited target packet to the forwarding port; obtain a forwarding network address that corresponds to the packet forwarding rule corresponding to the target packet, and send the edited target packet to the forwarding network address; or obtain a forwarding physical address that corresponds to the packet forwarding rule corresponding to the target packet, and send the edited target packet to the forwarding physical address. In this case, the forwarding module 44 may perform step S2081 and step S2082 in the method shown in FIG. 9.

The packet forwarding apparatus 4 in the embodiment shown in FIG. 13 may be configured to perform the technical solution in any one of the embodiments shown in FIG. 3 or FIG. 4 in the foregoing methods. Implementation principles and technical effects thereof are similar, and details are not described herein again.

Figure 14:
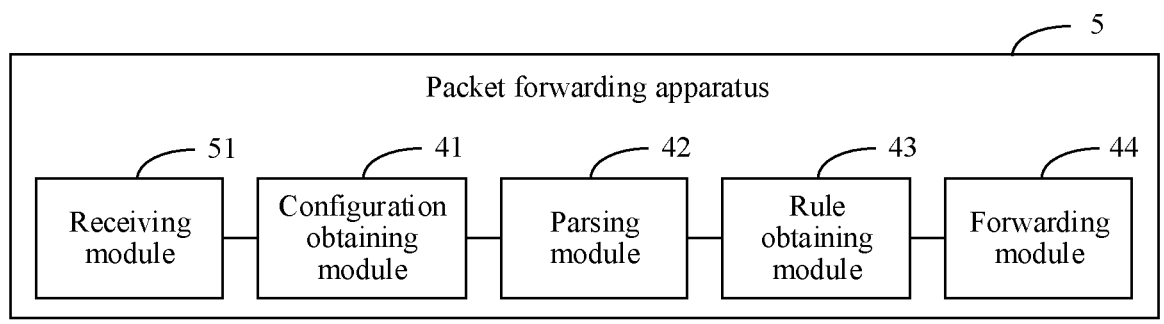
FIG. 14 is a schematic block diagram of another packet forwarding apparatus according to an embodiment of this application.

In an example, FIG. 14 is a schematic block diagram of another packet forwarding apparatus according to an embodiment of this application. Based on the packet forwarding apparatus shown in FIG. 14, a receiving module 51 is added to the packet forwarding apparatus 5 in this embodiment of this application, and is configured to receive user instructions. The packet forwarding apparatus 5 provided in this application further includes:

The receiving module 51 is configured to: receive online forwarding rule editing instructions entered by a user, and edit online the packet forwarding rule of the packet according to the forwarding rule editing instructions. In this case, the receiving module 51 may perform step S301 and step S302 in the method shown in FIG. 11.

In a possible implementation, when editing online the packet forwarding rule of the packet according to the forwarding rule editing instructions, the receiving module 51 is specifically configured to: parse online the forwarding rule editing instructions based on preset grammatical information to obtain a configuration table corresponding to the forwarding rule editing instructions, where the configuration table is used to represent a method for editing the packet forwarding rule of the packet; and edit online the packet forwarding rule of the packet based on the configuration table. In this case, the receiving module 51 may perform step S302 in the method shown in FIG. 11.

In this application, the packet forwarding rule is edited online by receiving the forwarding rule editing instructions entered by the user. In this way, a debugging operation such as updating or recompiling on the network device on the forwarding plane is not needed. This improves efficiency of adapting to different service data, reduces execution costs of traffic path optimization of the existing network device on the forwarding plane, and improves application flexibility and scope.

In a possible implementation, the configuration table includes first keyword information and second keyword information, the first keyword information is used to represent a current forwarding rule corresponding to the packet, and the second keyword information is used to represent an expected forwarding rule corresponding to the packet. When editing online the packet forwarding rule of the packet based on the configuration table, the receiving module 51 is specifically configured to: detect online a difference item between the second keyword information and the first keyword information in the configuration table, where the difference item is used to represent a difference between the current forwarding rule and the expected forwarding rule; obtain a forwarding rule editing policy corresponding to the difference item based on the grammatical information; and edit online the packet forwarding rule of the packet according to the forwarding rule editing policy. In this case, the receiving module 51 may perform step S3021 to step S3023 in the method shown in FIG. 12.

In this application, the first keyword information and the second keyword information are set, and the corresponding packet forwarding rule is determined based on the difference item between the first keyword information and the second keyword information. This simplifies complexity of entering the editing instructions by the user, improves operation efficiency of the user. In addition, because this is not limited by specific packet protocol content, different packet processing rules can be flexibly customized, and an application scope is improved.

The packet forwarding apparatus 5 in the embodiment shown in FIG. 14 may be configured to perform the technical solution in any one of the embodiments shown in FIG. 3, FIG. 4, or FIG. 11 in the foregoing methods. Implementation principles and technical effects thereof are similar, and details are not described herein again.

In addition, implementation of this embodiment does not depend on implementation of the embodiment shown in FIG. 13, and this embodiment may be independently implemented.

Figure 15:
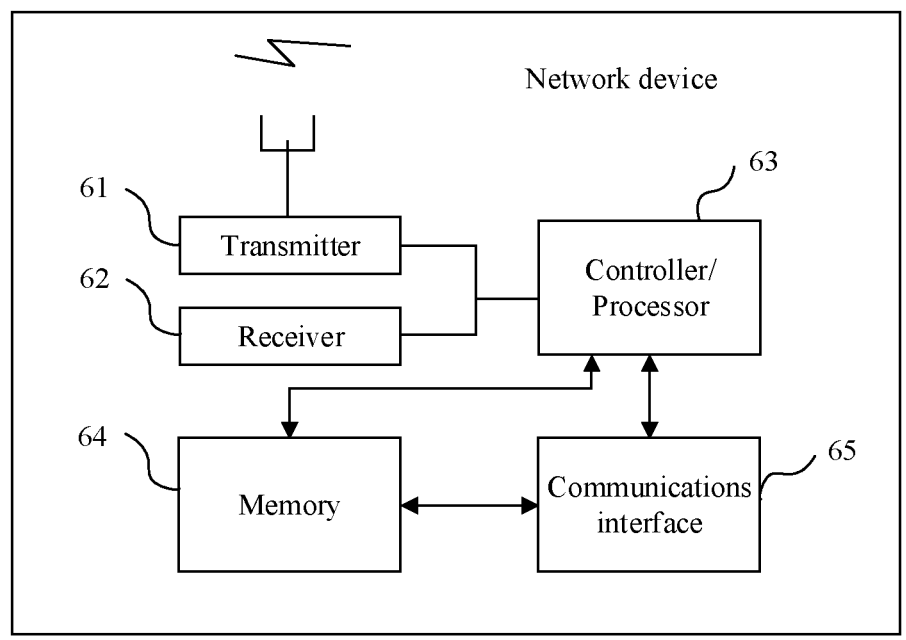
FIG. 15 is a schematic block diagram of a structure of a network device according to an embodiment of this application.

FIG. 15 is a schematic block diagram of a structure of a network device according to an embodiment of this application. As shown in FIG. 15, the network device includes a transmitter 61, a receiver 62, and a processor 63.

The processor 63 is configured to perform the steps in FIG. 3. Alternatively, the processor 63 is configured to perform the steps in FIG. 4. Alternatively, the processor 63 is configured to perform the steps in FIG. 11. The processor 63 is configured to implement the modules in FIG. 13 and FIG. 14.

The network device in the embodiment shown in FIG. 15 may be configured to perform the technical solutions in the foregoing method embodiments, or programs of the modules in the embodiments shown in FIG. 13 and FIG. 14. The processor 63 invokes the programs to perform operations in the foregoing method embodiments, to implement the modules shown in FIG. 13 and FIG. 14.

The processor 63 may alternatively be a controller, and is represented as "controller/processor 63" in FIG. 15. The transmitter 61 and the receiver 62 are configured to support the network device in sending and receiving information with each device in a network environment in the foregoing embodiments, and support the network device in communicating with each device in the network environment in the foregoing embodiments.

Further, the network device may include a memory 64. The memory 64 is configured to store program code and data of the network device. Further, the network device may include a communications interface 65.

The processor 63 may be, for example, a central processing unit (CPU), or may be one or more integrated circuits configured to implement the foregoing method, for example, one or more application-specific integrated circuits (ASICs), one or more microprocessors (DSPs), or one or more field programmable gate arrays (FPGAs). The memory 64 may be a memory, or may be a collective name of a plurality of storage elements.

It should be noted that, in the network device in FIG. 15 provided in this embodiment of this application, the transmitter 61 may perform a sending action corresponding to the foregoing method embodiments, the processor 63 performs a processing action, and the receiver 62 may perform a receiving action. For details, refer to the foregoing method embodiments.

Figure 16:
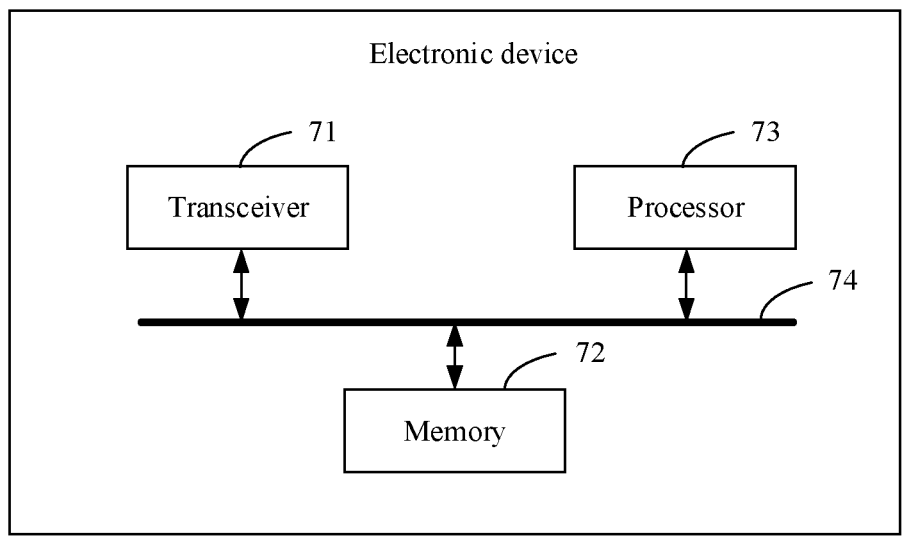
FIG. 16 is a schematic block diagram of a structure of an electronic device according to an embodiment of this application.

For example, FIG. 16 is a schematic block diagram of a structure of an electronic device according to an embodiment of this application. As shown in FIG. 16, the electronic device provided in this embodiment includes a transceiver 71, a memory 72, a processor 73, and a computer program.

The processor 73 is configured to control the transceiver 71 to send and receive a signal. The computer program is stored in the memory 72, and is configured to be executed by the processor 73 to implement the method provided in any implementation corresponding to FIG. 3 to FIG. 12 in this application.

The transceiver 71, the memory 72, and the processor 73 are connected through a bus 74.

For related descriptions, refer to related descriptions and effects corresponding to the steps in the embodiments corresponding to FIG. 3 to FIG. 12. Details are not described herein again.

An embodiment of this application further provides a computer-readable storage medium, including computer code. When the computer code is run on a computer, the computer is enabled to perform the method provided in any implementation corresponding to FIG. 3 to FIG.

An embodiment of this application further provides a computer program product, including program code. When a computer runs the computer program product, the program code performs the method provided in any implementation corresponding to FIG. 3 to FIG. 12.

An embodiment of this application further provides a chip, including a processor. The processor is configured to invoke and run a computer program stored in a memory, to perform corresponding operations and/or procedures performed by the network device in the packet forwarding method provided in any implementation corresponding to FIG. 3 to FIG. 12. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that needs to be processed, and the processor obtains the data and/or information from the communications interface, and processes the data and/or information. The communications interface may be an input/output interface. All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible to a general-purpose computer or a dedicated computer.

What is claimed is:

1. A packet forwarding method, wherein the method comprises:
    obtaining packet configuration information, wherein the packet configuration information comprises a packet parsing rule;
    parsing a target packet based on the packet configuration information to determine a target packet feature, wherein the target packet feature represents content of the target packet;
    obtaining target match field information corresponding to the target packet feature from a plurality of pieces of preset match field information, wherein the target match field information represents a key protocol field that is in the target packet and is for determining the target packet feature;

obtaining field content of the key protocol field of the target match field information;

performing a mapping calculation on the field content of the key protocol field of the target match field information, to obtain a feature identifier of the key protocol field of the target match field information;

obtaining a packet forwarding rule corresponding to the target packet based on a forwarding mapping table and the feature identifier of the key protocol field of the target match field information, wherein the forwarding mapping table represents a mapping relationship between the feature identifier and the packet forwarding rule;

editing the target packet according to the packet forwarding rule corresponding to the target packet to generate an edited target packet; and forwarding the edited target packet according to the packet forwarding rule corresponding to the target packet.

2. The method according to claim 1, wherein the target packet comprises a plurality of protocol fields, the packet configuration information comprises target field information, and the target field information represents locations of the plurality of protocol fields of the target packet in the target packet; and the parsing the target packet based on the packet configuration information to obtain the target packet feature comprises:

parsing the target packet based on the target field information to obtain field content corresponding to the plurality of protocol fields of the target packet;

obtaining a packet class code corresponding to the target packet based on the field content, wherein the packet class code represents an identifier corresponding to a packet feature; and obtaining the target packet feature corresponding to the target packet based on the packet class code corresponding to the target packet.

3. The method according to claim 1, wherein the mapping calculation comprises one or more of a hash calculation, linear transformation calculation, or longest match calculation.

4. The method according to claim 1, wherein the target match field information further comprises location information, and the location information represents a location of the key protocol field in the packet; and the obtaining field content of the key protocol field of the target match field information comprises:

obtaining a field area of the key protocol field of the target match field information in the target packet based on the location information in the target match field information; and determining packet content in the field area as the field content of the key protocol field of the target match field information.

5. The method according to claim 4, wherein the location information comprises an offset value and a length value, the offset value represents a start location or an end location of the key protocol field, and the length value represents a length of the key protocol field.

6. The method according to claim 1, wherein the packet forwarding rule comprises a target protocol field and field content corresponding to the target protocol field; and the editing the target packet according to the packet forwarding rule corresponding to the target packet to generate the edited target packet comprises:

obtaining a to-be-processed protocol field of the target packet based on the target protocol field of the packet forwarding rule corresponding to the target packet; and editing field content corresponding to the to-be-processed protocol field of the target packet as the field content corresponding to the target protocol field of the packet forwarding rule corresponding to the target packet, to generate the edited target packet.

7. The method according to claim 6, wherein the editing field content corresponding to the to-be-processed protocol field of the target packet as the field content corresponding to the target protocol field of the packet forwarding rule corresponding to the target packet, to generate the edited target packet comprises:

obtaining preset field content operation information, wherein the field content operation information comprises an operation action item, an operand length item, an operand offset item, and an operation value item, the operation action item represents an operation action on the to-be-processed protocol field, the operand length item represents a length of the to-be-processed protocol field in the target packet, the operand offset item represents a start location of the to-be-processed protocol field in the target packet, and the operation value item represents the field content corresponding to the to-be-processed protocol field; and editing, based on the operation action item, the operand length item, the operand offset item, and the operation value item, the field content corresponding to the to-be-processed protocol field as the field content corresponding to the target protocol field of the packet forwarding rule corresponding to the target packet, to generate the edited target packet.

8. The method according to claim 1, wherein the forwarding the edited target packet according to the packet forwarding rule corresponding to the target packet comprises:

obtaining a forwarding port that corresponds to the packet forwarding rule corresponding to the target packet, and sending the edited target packet to the forwarding port;

obtaining a forwarding network address that corresponds to the packet forwarding rule corresponding to the target packet, and sending the edited target packet to the forwarding network address; or obtaining a forwarding physical address that corresponds to the packet forwarding rule corresponding to the target packet, and sending the edited target packet to the forwarding physical address.

9. The method according to claim 1, wherein before the obtaining packet configuration information, the method further comprises:

receiving online forwarding rule editing instructions entered by a user; and editing online the packet forwarding rule of the packet according to the forwarding rule editing instructions.

10. The method according to claim 9, wherein the editing online the packet forwarding rule of the packet according to the forwarding rule editing instructions comprises:

parsing online the forwarding rule editing instructions based on preset grammatical information to obtain a configuration table corresponding to the forwarding rule editing instructions, wherein the configuration table represents a method for editing the packet forwarding rule of the packet; and editing online the packet forwarding rule of the packet based on the configuration table.

11. The method according to claim 10, wherein the configuration table comprises first keyword information and second keyword information, the first keyword information represents a current forwarding rule corresponding to the packet, and the second keyword information represents an expected forwarding rule corresponding to the packet; and the editing online the packet forwarding rule of the packet based on the configuration table comprises:
- detecting online a difference item between the second keyword information and the first keyword information in the configuration table, wherein the difference item is used to represent a difference between the current forwarding rule and the expected forwarding rule;
- obtaining a forwarding rule editing policy corresponding to the difference item based on the grammatical information; and
- editing online the packet forwarding rule of the packet according to the forwarding rule editing policy.

12. A network device, wherein the network device comprises a processor, a non-transitory memory, and a transceiver, wherein
- the processor is configured to control the transceiver to receive and send a signal;
- the non-transitory memory is configured to store a computer program; and
- the processor is further configured to invoke and run the computer program stored in the non-transitory memory, to enable the network device to perform the method comprising:
  - obtaining packet configuration information, wherein the packet configuration information comprises a packet parsing rule;
  - parsing a target packet based on the packet configuration information to determine a target packet feature, wherein the target packet feature represents content of the target packet;
  - obtaining target match field information corresponding to the target packet feature from a plurality of pieces of match field information, wherein the target match field information represents a key protocol field that is in the target packet and is for determining the target packet feature;
  - obtaining field content of the key protocol field of the target match field information;
  - performing a mapping calculation on the field content of the key protocol field of the target match field information, to obtain a feature identifier of the key protocol field of the target match field information;
  - obtaining a packet forwarding rule corresponding to the target packet based on a forwarding mapping table and the feature identifier of the key protocol field of the target match field information, wherein the forwarding mapping table represents a mapping relationship between the feature identifier and the packet forwarding rule;
  - editing the target packet according to the packet forwarding rule corresponding to the target packet to generate an edited target packet; and
  - forwarding the edited target packet according to the packet forwarding rule corresponding to the target packet.

13. The network device according to claim 12, wherein the target packet comprises a plurality of protocol fields, the packet configuration information comprises target field information, and the target field information represents locations of the plurality of protocol fields of the target packet in the target packet; and the parsing the target packet based on the packet configuration information to obtain the target packet feature comprises:
- parsing the target packet based on the target field information to obtain field content corresponding to the plurality of protocol fields of the target packet;
- obtaining a packet class code corresponding to the target packet based on the field content, wherein the packet class code represents an identifier corresponding to a packet feature; and
- obtaining the target packet feature corresponding to the target packet based on the packet class code corresponding to the target packet.

14. A non-transitory computer-readable storage medium, comprising a computer code, wherein when the computer code is run on a computer, the computer is enabled to perform the method comprising:
- obtaining packet configuration information, wherein the packet configuration information comprises a packet parsing rule;
- parsing a target packet based on the packet configuration information to determine a target packet feature, wherein the target packet feature represents content of the target packet;
- obtaining target match field information corresponding to the target packet feature from a plurality of pieces of preset match field information, wherein the target match field information represents a key protocol field that is in the target packet and is for determining the target packet feature;
- obtaining field content of the key protocol field of the target match field information;
- performing a mapping calculation on the field content of the key protocol field of the target match field information, to obtain a feature identifier of the key protocol field of the target match field information;
- obtaining a packet forwarding rule corresponding to the target packet based on a forwarding mapping table and the feature identifier of the key protocol field of the target match field information, wherein the forwarding mapping table represents a mapping relationship between the feature identifier and the packet forwarding rule;
- editing the target packet according to the packet forwarding rule corresponding to the target packet to generate an edited target packet; and
- forwarding the edited target packet according to the packet forwarding rule corresponding to the target packet.

* * * * *